(12) United States Patent
Joshi et al.

(10) Patent No.: US 11,824,645 B2
(45) Date of Patent: Nov. 21, 2023

(54) AGENTLESS SECURITY SERVICES

(71) Applicant: McAfee, LLC, San Jose, CA (US)

(72) Inventors: Harsha Ramamurthy Joshi, Bangalore (IN); Tirumaleswar Reddy Konda, Bangalore (IN); Shashank Jain, Bangalore (IN); Piyush Pramod Joshi, Aurangabad (IN); Himanshu Srivastava, Bangalore (IN)

(73) Assignee: McAfee, LLC, San Jose, CA (US)

( * ) Notice: Subject to any disclaimer, the term of this patent is extended or adjusted under 35 U.S.C. 154(b) by 666 days.

(21) Appl. No.: 16/933,289

(22) Filed: Jul. 20, 2020

(65) Prior Publication Data
US 2021/0385230 A1    Dec. 9, 2021

(30) Foreign Application Priority Data

Jun. 5, 2020    (IN) .............................. 202041023610

(51) Int. Cl.
*H04L 9/40*    (2022.01)
(52) U.S. Cl.
CPC ............ *H04L 63/126* (2013.01); *H04L 63/20* (2013.01)

(58) Field of Classification Search
CPC ............................. H04L 63/126; H04L 63/20
See application file for complete search history.

(56) References Cited

U.S. PATENT DOCUMENTS

| | | | |
|---|---|---|---|
| 2004/0240447 A1* | 12/2004 | Dorbolo | H04L 12/2856 370/395.32 |
| 2016/0301779 A1* | 10/2016 | Cui | H04L 45/566 |
| 2018/0007001 A1* | 1/2018 | Sun | H04L 63/0236 |
| 2018/0309786 A1* | 10/2018 | Apelewicz | H04W 12/04 |
| 2020/0259793 A1* | 8/2020 | Pangeni | H04L 63/0263 |

* cited by examiner

*Primary Examiner* — Hee K Song
(74) *Attorney, Agent, or Firm* — Patent Capital Group

(57) ABSTRACT

There is disclosed in one example a computing apparatus, including: a hardware platform including a processor, a memory, and a network interface; and instructions encoded within the memory to instruct the processor to: receive an incoming packet via the network interface; extract from the incoming packet a source port and a source internet protocol (IP) address; correlate the source port and source IP to a device identifier (ID); receive a network policy for the device ID; and apply the network policy to the incoming packet.

19 Claims, 25 Drawing Sheets

Fig. 3a

AGENTLESS SECURITY SERVICES

CROSS REFERENCE TO RELATED APPLICATION

This application claims the benefit of priority to Indian Patent Application Serial No. 202041023610, filed Jun. 5, 2020, entitled "AGENTLESS SECURITY SERVICES," the entire contents of which are hereby incorporated by reference in their entirety.

FIELD OF THE SPECIFICATION

This application relates in general to computer security, and more particularly, though not exclusively, to a system and method for providing agentless security services.

BACKGROUND

Endpoint security agents have long been considered an effective mechanism for protecting consumer devices. However, with a large number of internet of things (IoT) and similar devices entering the consumer space, installation of a traditional user agent is not always an option.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

FIGS. 3a and 3b illustrate an example of port mapping.

SUMMARY

Figure 1:
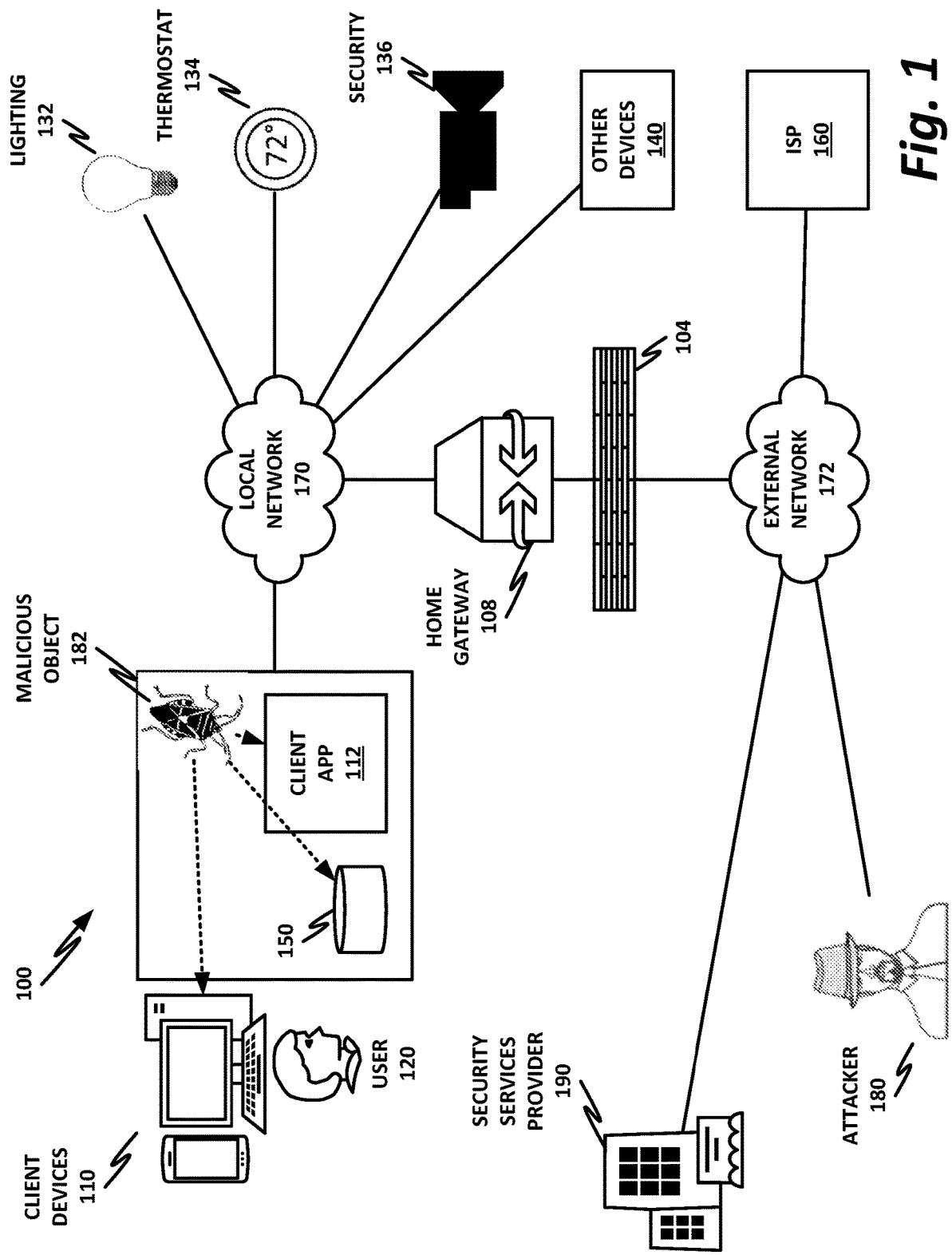
FIG. 1 is a block diagram of selected elements of a security ecosystem.

In an example, there is disclosed a computing apparatus, comprising: a hardware platform comprising a processor, a memory, and a network interface; and instructions encoded within the memory to instruct the processor to: receive an incoming packet via the network interface; extract from the incoming packet a source port and a source internet protocol (IP) address; correlate the source port and source IP to a device identifier (ID); receive a network policy for the device ID; and apply the network policy to the incoming packet.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Because many internet of things (IoT) and similar devices do not have the option of installing a traditional endpoint security agent, there are novel challenges in the computer security space. A security ecosystem previously would often include an agent running on the endpoint device, which would perform virus scans, filter traffic, and provide other services. While there is still much use for such endpoint agents, installing them on IoT devices or other "stripped-down" devices with minimal processing, memory, and storage abilities is not always an option. It is therefore advantageous to provide security to such devices without installing an endpoint agent. Furthermore, even in the case of more powerful devices, such as smart phones, laptops, desktops, and tablets, it can be advantageous to supplement their endpoint security services with cloud-based security services. One effective solution is to provide a home gateway or router that provides security services at the connection point. In a common home environment, all of the endpoint devices are connected to a single home gateway or router. Therefore, it is possible to provide network-based protection at this point. However, this may require the consumer who purchases the home gateway, or the internet service provider (ISP) that provides the home gateway, to update the home gateway. Updating the home gateway may be resisted by forces such as product momentum. There is a large number of deployed devices, and many users are not inclined to replace their existing devices. Even if they are so inclined, there are challenges in deploying effective security software in all of the many different gateway devices available from many different original equipment manufacturers (OEMs). Furthermore, many home gateways are low-end devices with very limited compute and memory capacities, which can make them a bottleneck for a security agent installation.

Because of the limitations of gateways, some security vendors also provide hybrid solutions in which a minimal agent resides on the gateway, while major security services move to the cloud. These solutions may require the minimal agent on the home gateway, because cloud services may be blind to the devices present inside the home network, and these devices are the source of the actual traffic going out to the cloud service. Minimal agents can help the cloud services to segregate traffic based on origin device, and apply network-wide or device-specific policies. This solution circumvents the gateway's computational limitations, but does not eliminate the need for an agent on the gateway, and thus faces similar barriers to adaptation in a very large consumer market with an installed base that numbers literally in the billions. Installing security updates to all these home gateways is a monumental difficulty.

Advantageously, it is possible to provide security services via a home gateway without installing new software. In the present specification, cloud-based security solutions are provided that work without any agent on the middle box (e.g., home gateway), and do not require updates to most existing consumer home gateways. This means that security services can be provided, in some cases, without introducing any changes to the software, firmware, or hardware of the gateway. This provides an agentless security on the home gateway or router.

Embodiments of the present specification provide cloud-based security services via a home gateway that can be configured on a mobile or desktop application. One embodiment of the present specification uses the TR69 protocol, which is almost universally supported by middle boxes such as home gateways or routers supplied by ISPs. For those devices that do not support TR69, many of them support an equivalent mechanism. Using TR69, security services can be provided to home gateway devices without the need to install any agent on the gateway. In an illustrative example, a home gateway or router supports TR69 or an equivalent protocol through which routing rules can be configured from the cloud. Most routers provided by telecommunications companies and ISPs support built-in TR69. For example, ISPs typically use the TR69 protocol to provision settings to the home gateway in an automated way. Most devices that do not support the TR69 protocol exactly are third-party consumer devices that are purchased independently of the ISP. While these may not support TR69, many of them support a similar protocol, or provide some mechanism to configure port forwarding.

In an embodiment of the present specification, a security services provider hosts a domain name system (DNS) forwarder/recursive resolver on the ISP cloud. Unlike a traditional DNS forwarder/recursive resolver, the resolver of the present specification does not listen only on the traditional port 53 that is used for DNS traffic. Instead, this recursive resolver may listen and serve DNS requests on a set of ports. The home gateway may be configured using TR69 or an equivalent protocol to forward DNS requests for each individual device, using a different destination port via port mapping. This port mapping is used to forward requests to the recursive resolver hosted on the ISP cloud. This enables the DNS server running on the cloud to uniquely fingerprint and identify each device based on the port, and which receives the DNS requests.

The mechanism may also use a mobile application that can help to initially fingerprint devices by making additional network probes using, for example, UPnP, mDNS, or similar. This application may serve as the administrative control point, and may include end user configurable options, such as policies that are to be applied to individual devices. This allows the home user to mark the devices in the home. According to categories, such as parent device, child device, IoT device, or other categories. The end user can then configure parental controls or other policies for each device, an update device-specific information like type, manufacturer, make, model, or other information for better or more fine-grained control. Once the fingerprint is complete and the user has configured the policies using the administrative controls, the policies may be applied to the cloud, where DNS traffic from each device is already separated by incoming port.

Furthermore, based on the connected devices, the cloud service may configure network address translation (NAT) functionality in the home gateway using TR69 or equivalent, to allocate a source port from a different unique range for traffic (e.g., traffic other than DNS traffic) originating from each device during address translation. The unique source port range may then be used by the cloud service to uniquely identify traffic from each device and apply the corresponding privacy and security policies for enforcement.

The method disclosed herein can eliminate the need for installing an agent, which may otherwise need to be bundled with OEM firmware for the home gateway. The method can be supported on any router that provides TR69 or an equivalent or similar protocol like router management software on the ISP side. This provides an agentless network-based security ecosystem for consumer home devices. The same technique may also be employed in enterprises, government networks, businesses, data centers, or other deployments. Home end user deployments on consumer premises equipment (CPE) are used throughout this specification as an illustrative example to illustrate the teachings of the specification. However, this should be understood to be nonlimiting. For example, an enterprise gateway could be used to provide similar services to enterprises or other entities.

Because most home gateways support standard configuration protocols like TR69 or equivalent, there is little need to manually reconfigure or modify these devices. Instead, a DNS forwarder/recursive resolver provided by the security services provider can work in conjunction with other security inspection engines like L3, L4, or L7 inspection engines. These can be deployed in the ISP cloud. Advantageously, the solution disclosed herein may need only one application to be installed on a connected endpoint, such as the user's phone or personal computer (PC), for administrative purposes. This allows the user to enumerate, identify, and classify devices, and apply appropriate security to each one.

In an illustrative example, the method starts with an administrative application scanning the local network and discovering and enumerating connected devices on the network. These devices may be fingerprinted. For example, a hash of the media access control (MAC) address of each device may be used as a unique identifier for that device. This hash may be used as an index into, for example, a content addressable memory (CAM) or a database, or some other data structure. There can be associated with this hash of the MAC address characteristics such as the name of the device, class of the device, user of the device, manufacturer, or other identifying information. Essentially, any information that may be useful in applying security policies to the device can be assigned to the device, and can be deduced automatically or assigned manually by the user. For example, if a device ID is found, a global database of devices can be queried to determine known information about devices with that ID. This may be supplemented with specific information provided by the user. For example, if a device is enumerated as being a videogame system, then the identifier can be used to query information about that class or type of videogame system. The home user may then assign additional characteristics to the device, such as that it is a device operated by children, and should therefore have more restrictive parental controls. Other devices may be assigned other categories and security classifications. The categorizations may then be uploaded to the cloud service. Thus, the user (home administrator) can assign security or other policies to individual devices, or to classes of devices.

The information about each device, along with its unique identifier (e.g., based on a hash of its MAC address), may be uploaded to the ISP cloud. The ISP cloud may then use TR69 or an equivalent protocol or mechanism to configure the home gateway with a specific DNS destination port to be used for each connected device. It may also configure the home gateway to use a specific source port range to be used for other flows (i.e., flows other than DNS queries) to each device. These port mappings can be assigned at the home gateway via NAT, using a NAT engine that is commonly found on such devices.

The configured destination ports and source port ranges may then be employed on all traffic originating from the home gateway. The DNS server inspection engine hosted on the ISP cloud can use port numbers to uniquely identify the device within the home, from which the traffic is originating. For example, home devices may be configured to use the home gateway as their DNS resolve. A device may send a DNS query via port 53 to the home gateway (e.g., to address 192.168.1.1 or another), and the NAT engine on the home gateway may map this to port 10006 (a port assigned to uniquely identify DNS queries from that particular device) before forwarding the request. On the ISP cloud, it is known that a packet on port 10006 from the IP address assigned to the home gateway maps to the device that originally sent the request. Similarly, DNS queries may be mapped to port 10007 for a second device, and 100008 for a third.

Once the device is identified, a DNS server and inspection engine may consult a preconfigured policy for the device to determine the action to be taken. The server may then enforce the action.

Policies can similarly be assigned for non-DNS traffic. For example, source port ranges may be assigned to each individual device in the network. When the device sends a packet (e.g., to port 80 or 443 for HTTP or HTTPS traffic), it will select a random port number outside of the "reserved" port range. When the home gateway receives this request, it maps the source port to the port range assigned for that device. For example, the device may randomly select port 32749 as the source port for a packet with destination port 80 (HTTP). If that device was assigned 54200-54500 as its source port range, the home gateway will map the source port to a port in that range (e.g., 54276). When the ISP cloud sees this packet, it can query its port mappings and determine (based on the combination of the source port and the home gateway's IP address) which device originated the packet, and apply an appropriate security or network policy. When the home gateway receives the response packet, it can then map the destination port back to 32749, so that the packet flow is maintained by the endpoint device. Thus, the application (and even the existence) of the security or network policy can be maintained completely transparent to the endpoint device, which can be useful, especially for devices such as IoT devices with limited on-board processing and configuration capability.

Advantageously, network and security policies can be applied to devices using the teachings of the present specification in an agentless fashion. This requires little or no configuration of endpoint devices, other than the administrative device (smartphone, computer, etc.) that the home user operates to configure the service.

A system and method for providing agentless security services will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various IoT devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that feature service function chaining (SFC) or NFV, gateway 108 may be include one or more service functions and/or virtualized network functions.

Home gateway 108 may have a TR69 programming interface, or it may have other capabilities such as NAT that can be programmed or configured. In many cases, NAT can be configured via a text file, particularly if home gateway 108 is a Linux or Berkeley Software Distribution (BSD)-based home gateway, which many of them are.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

ISP 160 may partner with security services provider 190 to provide agentless device security, according to the teachings of the present specification. For example, ISP 160 may configure its own NAT rules to be cognizant of the configuration of home gateway 108. This enables ISP 160 to interface with security services provider 190, which may provide a cloud service based on, for example, port assignments. Because ISPs commonly provide their own NAT services, it is beneficial for ISP 160 to interface with security services provider 190 to ensure that the IP address and port translations do not get lost between home gateway 108 and security services provider 190.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2A:
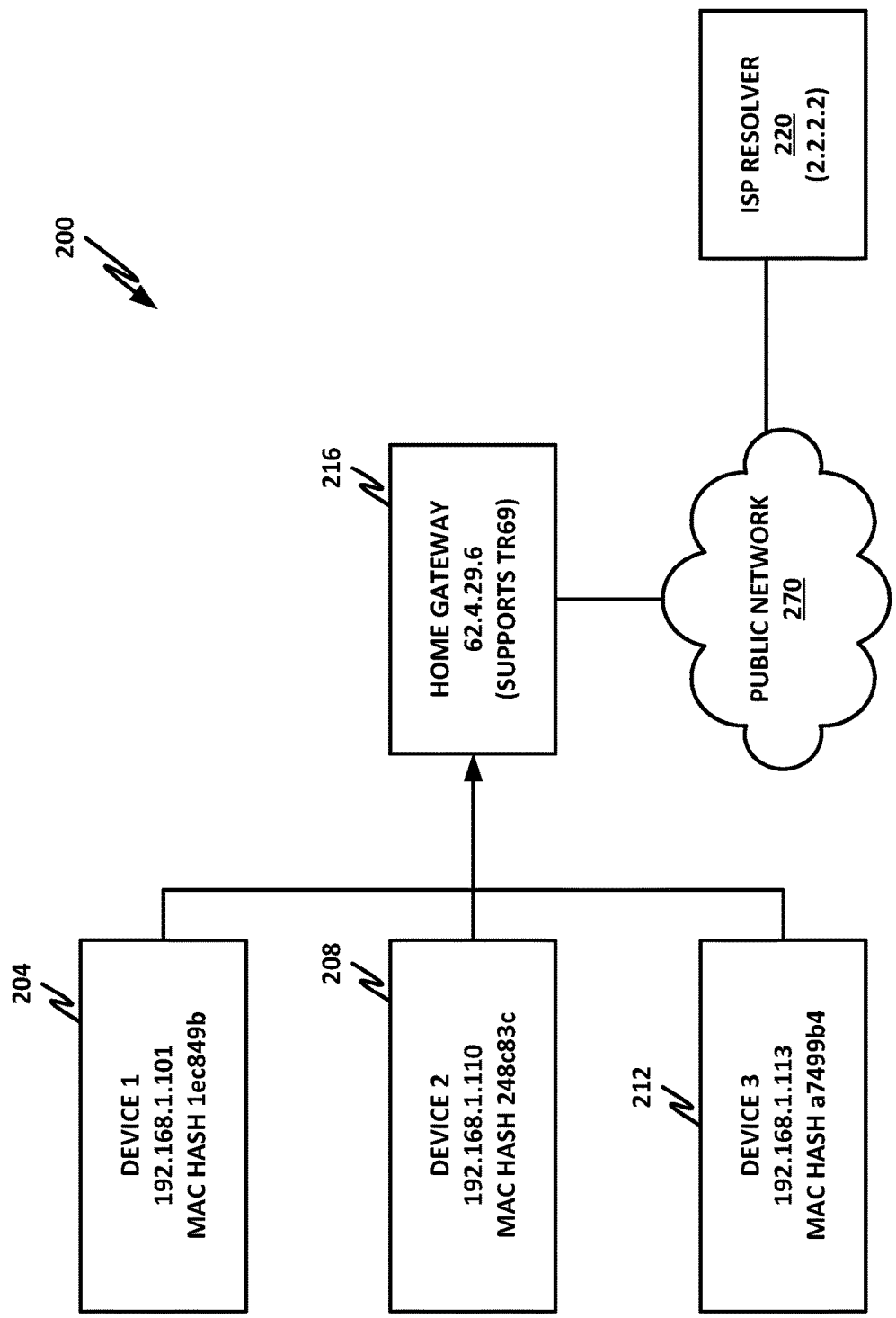
FIG. 2a is a block diagram of further selected elements of a computing ecosystem.

FIG. 2a is a block diagram of further selected elements of a computing ecosystem 200. Computing ecosystem 200 includes a home gateway 216, with connected device 1 204, device 2 208, and device 3 212. Home gateway 216 supports TR69, and connects via public network 270 to an ISP resolver 220.

In this illustration, home gateway 216 has a public IP address 62.4.29.6, or any other public IPv4 or IPv6 address, or similar. ISP resolver 220 has the public IP address 2.2.2.2. Home gateway 216 is configured to use 2.2.2.2 as its DNS resolver.

Within the home network, device 1 204 has IP address 192.168.1.101, and its MAC address has been hashed to the value 1ec849b. Device 2 208 has IP address 192.168.1.110, and its MAC address has been hashed to 248c83c. Device 3 212 has IP address 192.168.1.113, and its MAC address has been hashed to a7499b4. These internal IP addresses may change frequently within the home network, so the internal IP address may not be a reliable or consistent mechanism for identifying the device. For example, if device 1 204 and device 2 208 both go down and come back up, device 1 could be assigned IP address 192.168.1.110, and device 2 208 could be assigned 192.168.1.103. Because there is no guarantee of IP address consistency, the MAC hash is a superior mechanism to identify the devices, because the MAC address is not expected to change frequently.

According to the teachings of the present specification, ISP resolver 220 may interface with a security services provider, and provide services according to the teachings of the present specification.

Figure 2B:
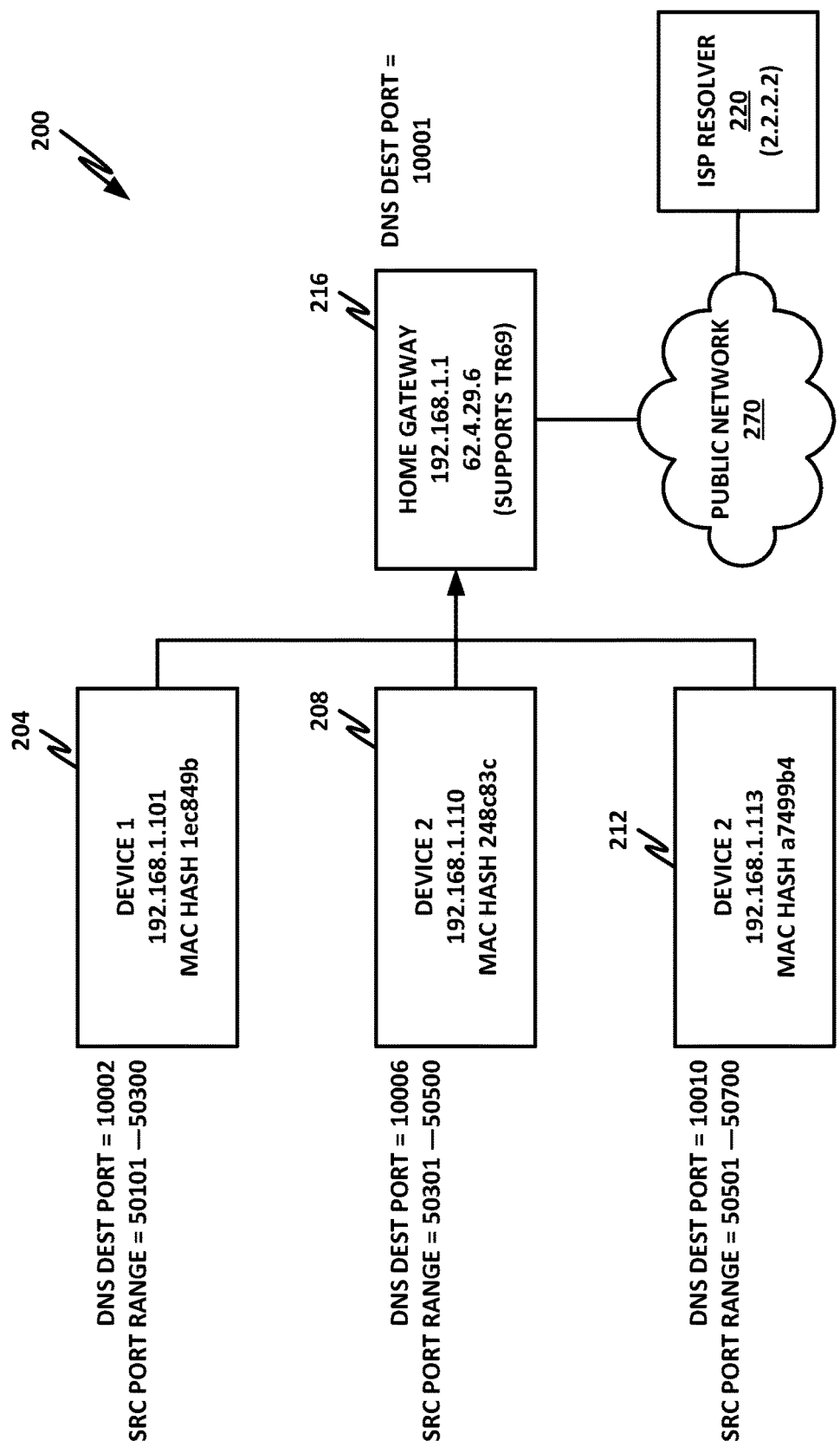
FIG. 2b illustrates the computing ecosystem of FIG. 2a, with additional assignments made.

FIG. 2b illustrates computing ecosystem 200 of FIG. 2a, with additional assignments made. In this case, two options are shown. In one case, a single DNS policy could be applicable to the entire home network. In that case, home gateway 216 may be configured to use DNS destination port 10001 for all traffic on the network. This single DNS destination port could be associated with home gateway 216, and the same DNS policy could be applied to all traffic on the network. This is desirable in the case where, for example, there is a uniform policy for the entire network. This could be the case in a home where the home desires to allow or block access to certain websites en grosse, or on an enterprise network where certain addresses are within policy and other addresses are outside of policy and should be blocked.

Devices 204, 208, and 212 may be configured to use home gateway 216 as the DNS resolver, and home gateway 216 may, for example, have the IP address 192.168.1.1. Home gateway 216 may have a DNS stub resolver or caching DNS resolver that provides some minimal DNS services, including DNS services on the local network, but exports most non-cached or nonlocal DNS queries to ISP resolver 220. ISP resolver 220 in turn may be configured to interface with a cloud service before resolving IP addresses to ensure that the IP addresses are according to policy.

In an alternative embodiment, the network administrator or home user may desire to have different DNS rules for individual devices. For example, parents' devices may have different rules from children's devices. In that case, each device may be assigned its own DNS destination port, and this allows port mapping to be used to apply individualized DNS rules to each device. In this illustration, device 1 204 has DNS destination port 10002, device 2 208 has DNS destination port 10006, and device 3 212 has DNS destination port 10010.

Furthermore, the cloud-based security service may assign a specific source port range to each device for port mapping purposes. In this illustration, device 1 204 has been assigned source port range 50101 through 50300. Device 2 208 has been assigned source port ranges 50301 through 50500. Device 3 212 has been assigned source port ranges 50501 through 50700. These assignments are provided by way of illustration only, and any suitable source port range may be used. In particular, it may be desirable to use non-reserved source port ranges such as port numbers greater than or equal to 1024, which are considered reserved and well-known ports. The port assignments could also exclude port numbers 1024 through 49151, which may be considered registered ports. In general, registered ports are considered less static and less fixed than the well-known ports less than or equal to 1023. However, it is often considered best practice to use only ports greater than or equal to 49152 as ephemeral ports.

It should also be noted that these source port ranges do not require any changes to the endpoint devices. For example, device 3 212 may be an IoT device with little or no configuration capability, and in particular, with little end user configuration capability. Device 3 212 may randomly select an ephemeral port between 49152 and 65535 for outgoing traffic. Home gateway 216 may then be configured to use NAT or other services to map this outgoing port to a port within the appropriate range for device 3 212. When the return packet arrives at home gateway 216, its destination port will then be the port selected from within the source port range for device 3 212. Home gateway 216 can then reverse map this port, and convert the destination port to the randomly selected ephemeral port used by device 3 212. Thus, the operation of the network services may be completely transparent to endpoint devices such as 204, 208, and 212. They can continue to use their traditional transmission control protocol (TCP)/IP stacks and continue to randomly select ephemeral ports as desired for their network traffic. The network and port translation is handled by home gateway 216.

Figure 3A:
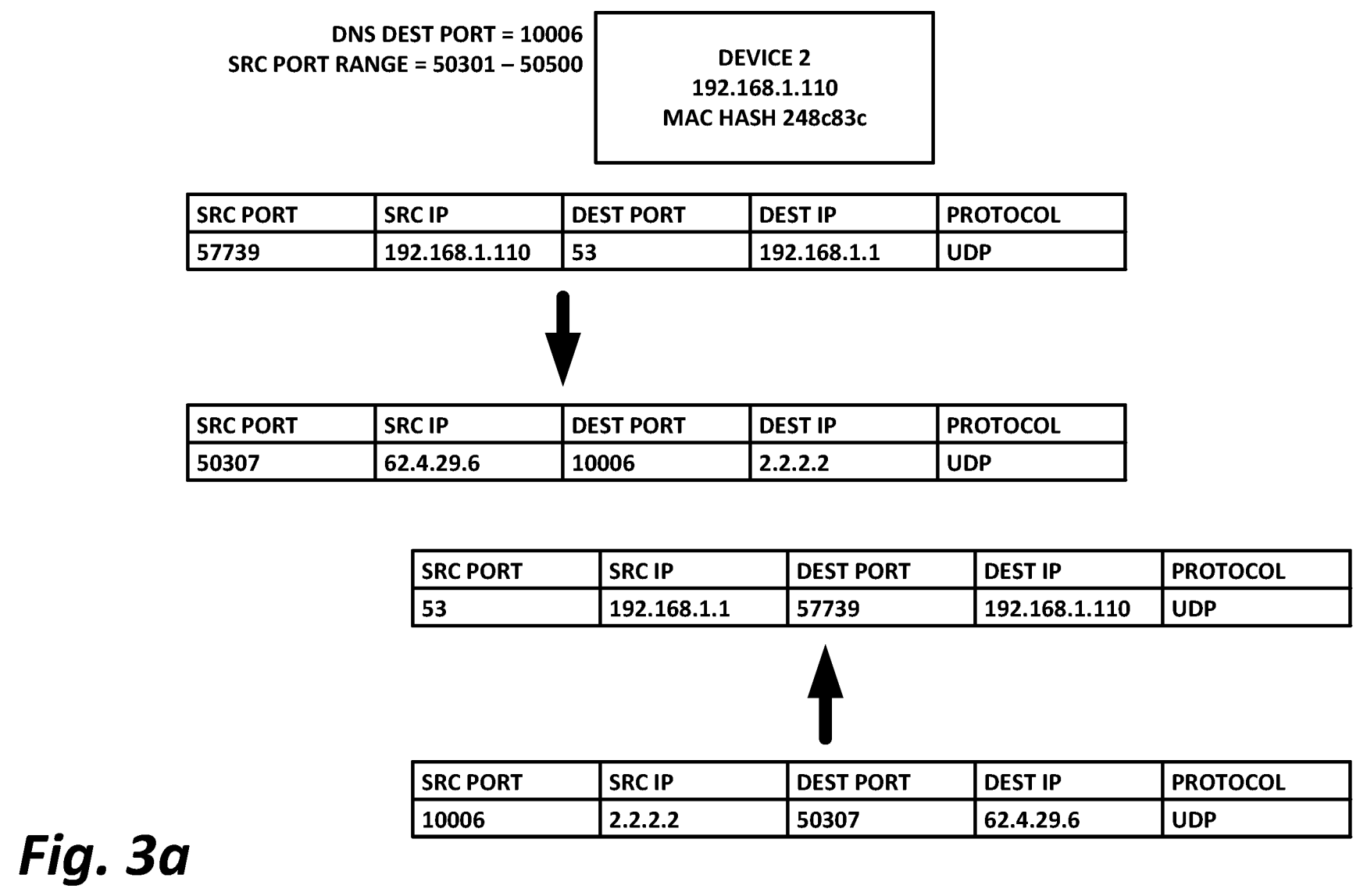
Figure 3B:

FIGS. 3a and 3b illustrate an example of port mapping. In the example of FIG. 3a, device 2 208 has IP address 192.168.1.110 and DNS destination port 10006, with source port range 50301 through 50500.

When device 2 208 sends a DNS query, it may randomly select an ephemeral port, such as 57739, as its source port. The source IP is 192.168.1.110. The destination port is 53 for DNS services. The destination IP is 192.168.1.1, because device 2 208 has been configured to use home gateway 216 as its DNS resolver. The protocol is user datagram protocol (UDP), as is common for DNS traffic.

When home gateway 216 receives this packet, it performs a NAT. The header is modified so that the source port is now 50307, identifying this as the assigned source port for device 2 208. The source IP is translated to 62.4.29.6, which is the public IP address of home gateway 216. The destination port is 10006, which is the assigned DNS destination port for device 2 208. Note that alternatively, in the case where a single DNS policy is used for the entire home gateway, the destination port may be 10001, as illustrated in FIGS. 2a and 2b.

The destination IP is mapped to 2.2.2.2, which is the address of the ISPs public DNS resolver, which interfaces with the security services provider cloud. The protocol UDP is maintained because this is still a DNS query, which uses UDP.

When the response packet arrives, the 5-tuple illustrated is used to maintain a coherent network flow. In this case, the response packet header has the tuple source port 10006, source IP 2.2.2.2. The destination port is 50307, and the destination IP is 62.4.29.6. Home gateway 216 performs a reverse mapping and rewrites the header so that the source port is 53, the source IP is 192.168.1.1, the destination port is 57739, and the destination IP is 192.168.1.101.

Turning to FIG. 3b, an example is illustrated for a non-DNS query. In this case, device 2 208 still has the DNS destination port assignment 10006 and the source port range assignment 50301 through 50500. After querying the DNS service, device 2 208 tries to reach an HTTP web service at destination IP 6.7.8.9. Thus, device 2 208 writes a packet header with source port 59634, source IP 192.168.1.110, destination port 80, and destination IP 6.7.8.9. In this case, the protocol is TCP, as is commonly used for HTTP queries.

When home gateway 216 receives this packet, it rewrites the header with source port 50444, which is within the assigned range for device 2 208. The source IP is 62.4.29.6, which is the public IP address of home gateway 216. The destination port remains 80, because there is no need for a new destination port in a non-DNS query. The destination IP remains 6.7.8.9. The protocol remains TCP.

When the server at 6.7.8.9 responds, the packet header will have source port 80 and source IP 6.7.8.9. The destination port will be 50444, and the destination IP will be 62.4.29.6. Home gateway 216 will use its NAT services to rewrite this header so that the source IP remains 6.7.8.9, and the source port remains 80. The destination IP becomes 192.168.1.110, and the destination port becomes 59643. The protocol remains TCP.

Figure 4:
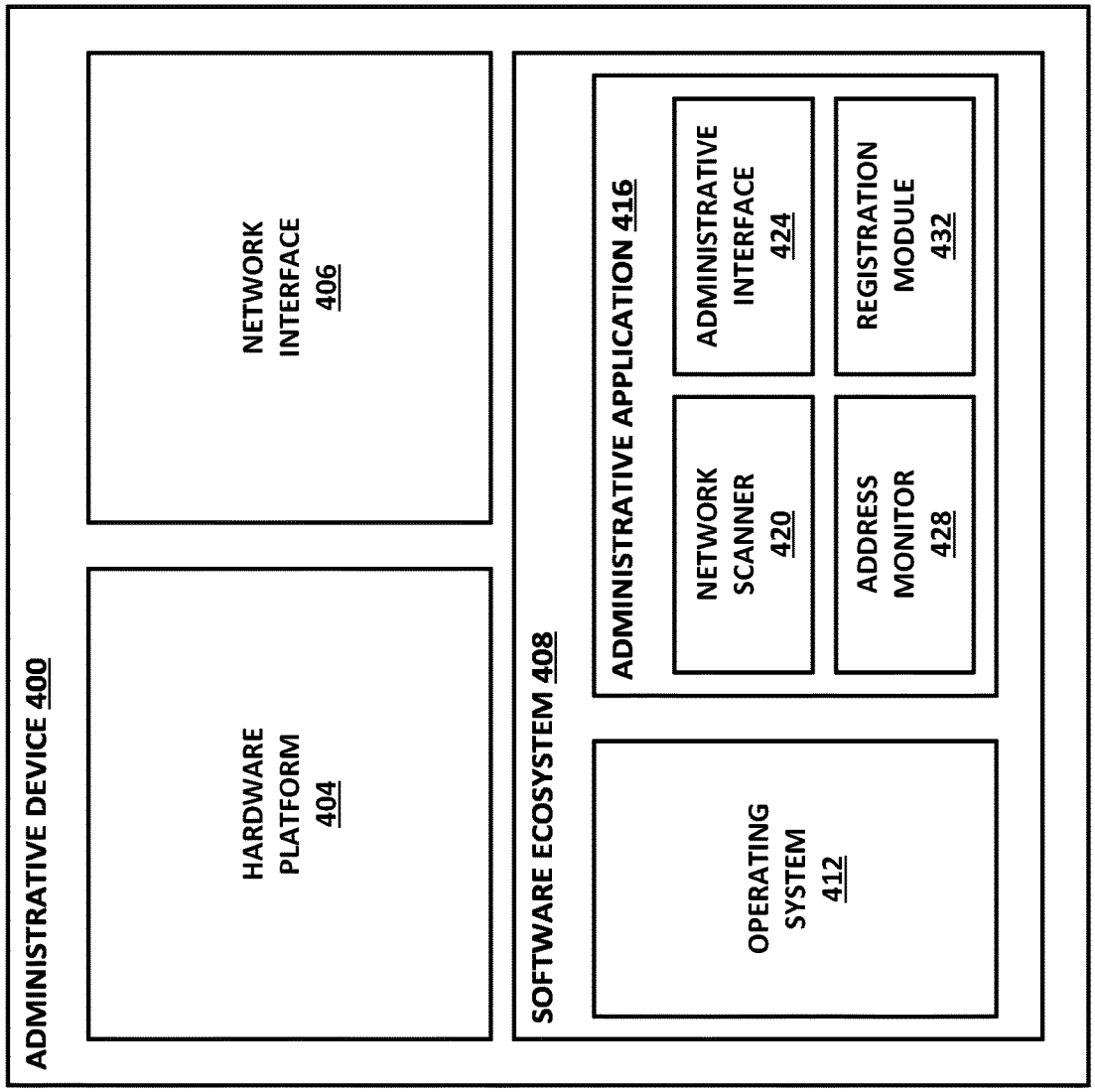
FIG. 4 is a block diagram of an administrative device.

FIG. 4 is a block diagram of an administrative device 400. Administrative device 400 runs an administrative application 416. Administrative application 416 may be used by a home or enterprise administrator to uniquely identify devices connected to the home network, and to configure device-specific policies for each device. It also allows the user to mark devices with particular roles, such as parent or administrative devices, and child or ordinary user devices. Different security policies may then be applied to these different devices.

Administrative application 416 may be installed on any suitable device, such as a PC or mobile device. It allows the user to correctly identify connected devices by changing or updating their type, manufacturer, make, and model information.

Figure 16:
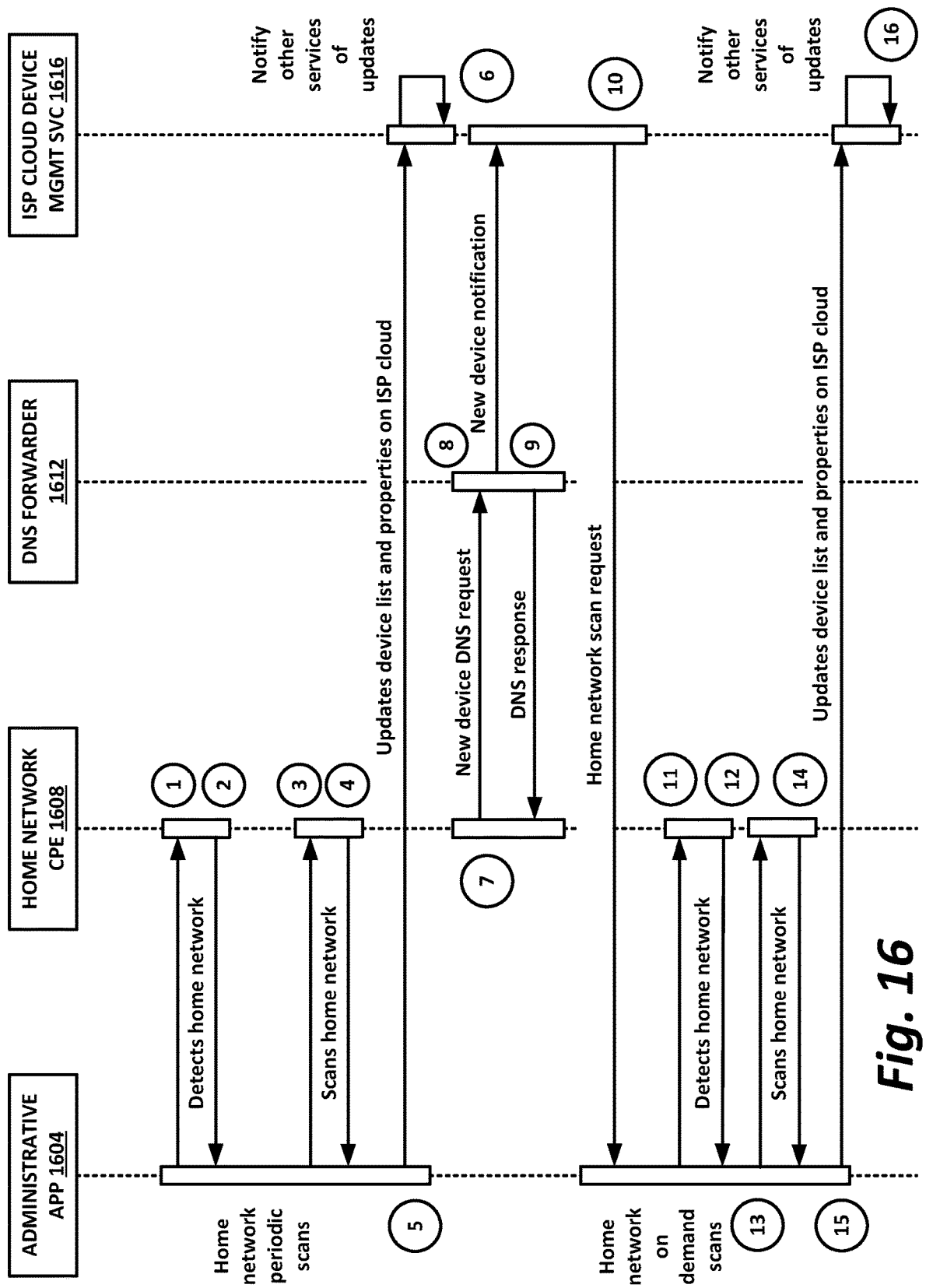
FIGS. 16-19 are signal flow diagrams providing certain algorithms according to the teachings of the present specification.

Illustrative tasks for the administrative application 416 include registration and identification of the home network. This registration and identification can be performed in various ways, and one example is provided as an illustration. Specifically, the signal flow diagram of FIG. 16 illustrates one method of carrying out the function of the administrative device.

The user may install the application and register the application, for example, by inputting his ISP subscriber ID, subscription mail ID, username, password, or other authentication information into the application. On launch, the application may detect changes to the network and provide a management API (e.g., CheckIfHome), where it passes its subscriber ID. The ISP service may receive the request and match the subscriber ID and IP from which it received the request and validate whether the administrative device is connected to a home network.

The application may also discover devices in the local network and fingerprint them by performing additional network probes, such as UPnP, mDNS, or similar. The application may then upload the connected device list and the corresponding identification information to a device manager service of the ISP cloud. The application may also push user configured, device-specific policies, such as parental control or security policies, to the policy manager service on the ISP cloud. The application may also alert or notify the user in case the DNS server at any inspection engine blocks any flows.

By way of architecture, administrative device 400 includes a hardware platform 404. In addition to a processor and memory, hardware platform 404 may also include a network interface 406.

Administrative device 400 also includes a software ecosystem 408 hosted on hardware platform 404. By way of illustrative example, software ecosystem 408 includes operating system 412 and administrative application 416.

To provide the services discussed above, administrative application 416 may include several modules. These may include, for example, a network scanner 420, an administrative interface 424, an address monitor 428, and a registration module 432.

Network scanner 420 may be used to scan the local network and to enumerate devices on the local network.

Administrative interface 424 may be provided to allow the user to make configuration changes to network policies, and to device identification and other metadata.

Address monitor 428 may be used to check, for example, the user's location, and to determine whether the user is connected to the home network. If the user is connected to the home network, then it may be necessary to update the IP address of the home network. This is because many home networks do not have a static IP address, but rather have a dynamic IP address assigned by a DHCP server of the ISP. Because the cloud services rely on a combination of the public IP address and port assignments to uniquely identify devices on the network, the cloud service may need to be kept up-to-date with the home network's current IP address. Thus, address monitor 428 can report to the cloud service when the IP address is changed.

Registration module 432 may be provided to facilitate registration, as well as authentication once the user has initially registered.

The foregoing description of FIG. 4 provides a textual description of several algorithms that may be carried out by an administrative device 400. The flowchart of FIG. 5 and the signal flow diagram of FIG. 16 provide additional support for these algorithms.

Figure 5:
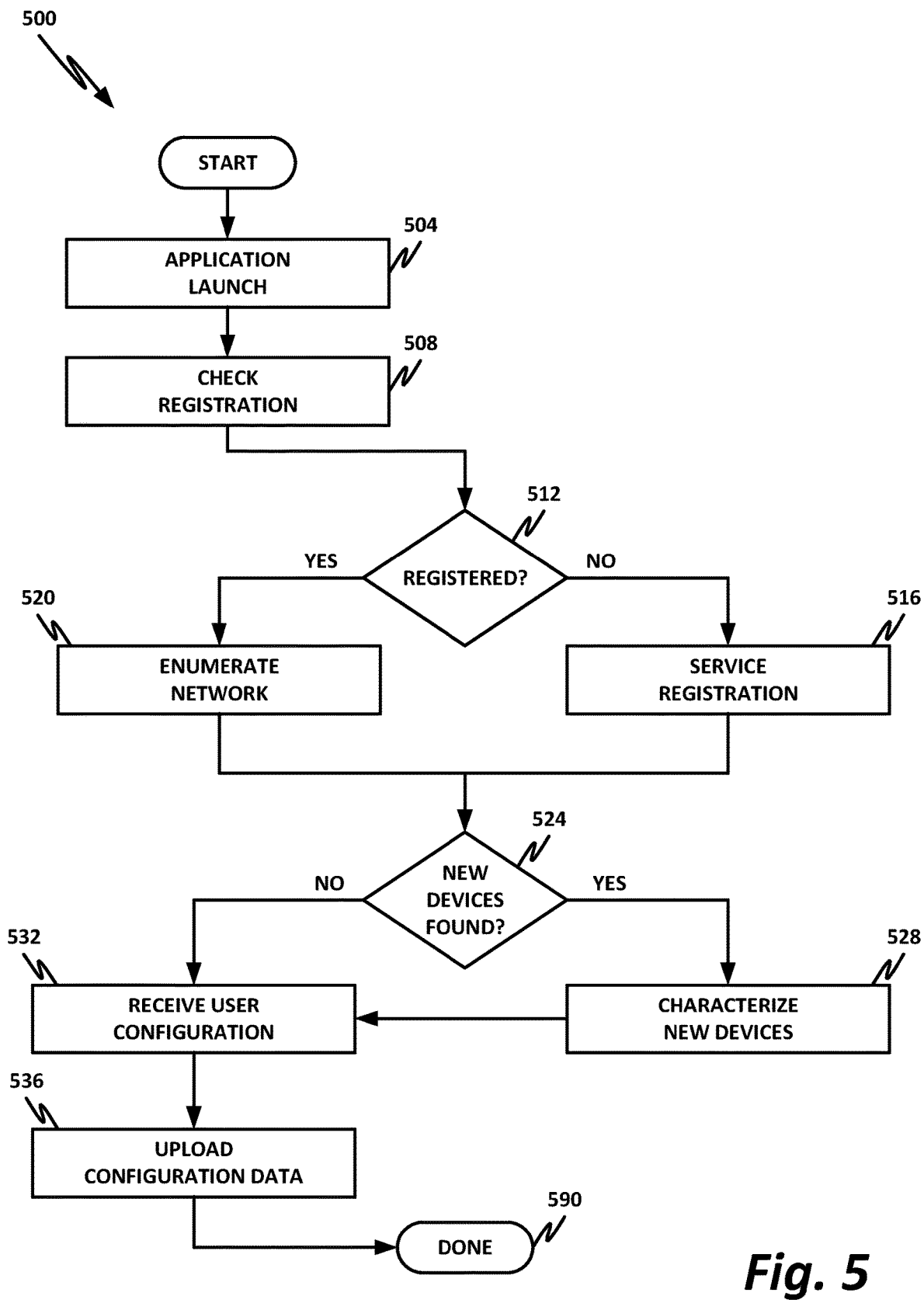
FIG. 5 is a flowchart of a method.

FIG. 5 is a flowchart of a method 500.

Starting in block 504, the administrative application is launched on an appropriate administrative device.

In block 508, the administrative application may check whether the user is currently registered with the ISP service.

In decision block 512, if the user or home network are not registered, then in block 516, the administrative application may perform a service registration.

Returning to decision block 512, if the user or network are already registered, then in block 520, the administrative application enumerates the network. Network enumeration of block 520 may also follow service registration 516, as necessary.

In decision block 524, the administrative application checks whether new devices have been found on the network.

In block 528, if new devices have been found on the network, then the administrative application may characterize the new devices, such as by hashing their MAC addresses, extracting any metadata about the devices via UPnP, or via other network probes, soliciting user input, or performing any other characterization.

Another aspect of device characterization may include updating the internal IP address of the device with the router, or with the ISP service or cloud service, so that the appropriate IP address and port mapping can be maintained on the home gateway.

From block 528, control may flow to block 532.

Returning to decision block 524, if new devices are not found, then user configuration can proceed.

In block 532, the administrative application receives any changes to the user configuration, which can include changes in policy, changes in device characterization, or other information about the network.

In block 536, the administrative application may upload new configuration data to the cloud service for handling by the cloud service.

In block 590, the method is done.

Figure 6:
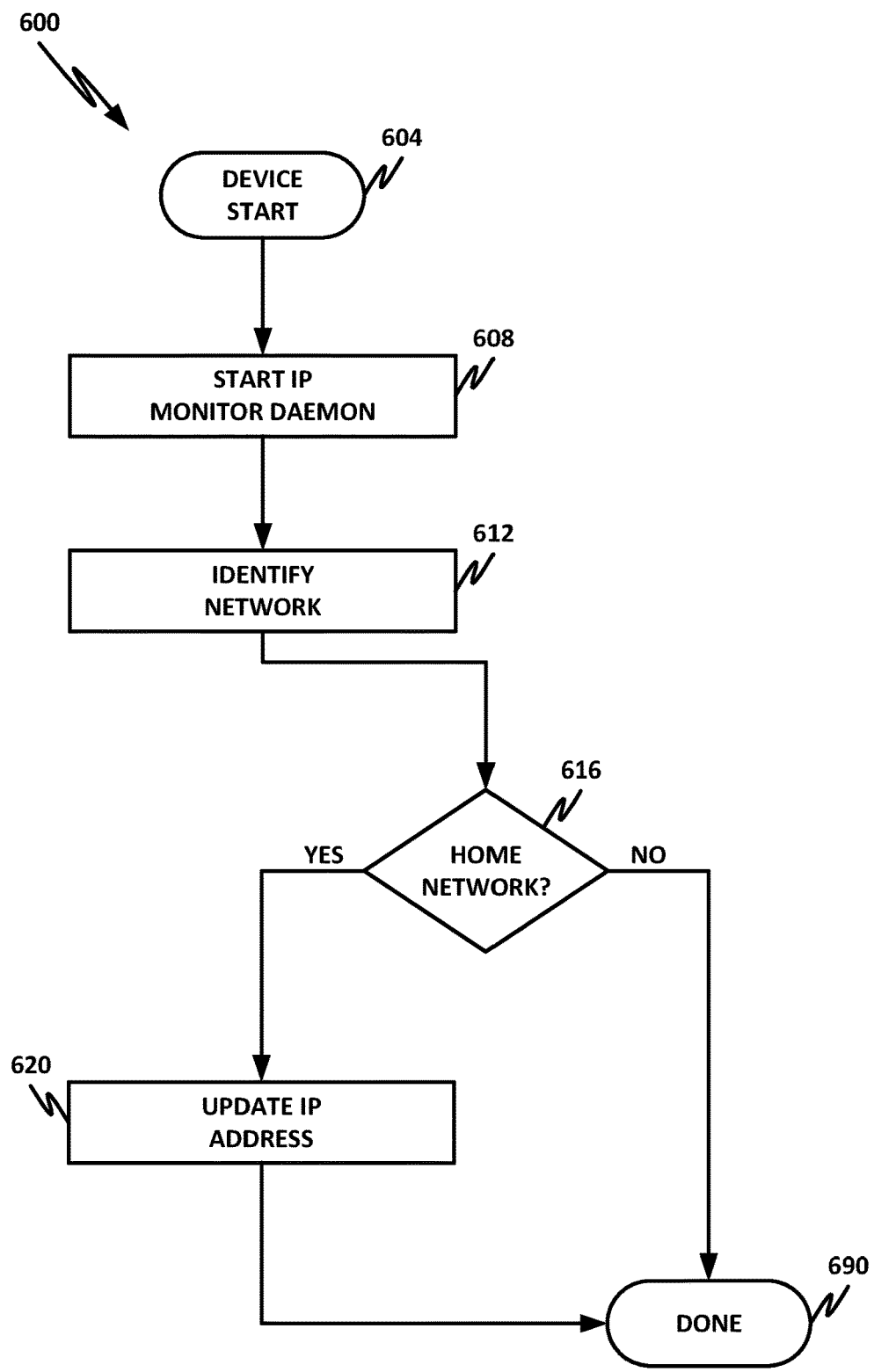
FIG. 6 is a flowchart of an additional method.

FIG. 6 is a flowchart of a method 600. Method 600 provides another aspect of an algorithm that may be carried out, for example, by administrative application 416 of FIG. 4.

In block 604, the device starts.

In block 608, an address monitor may start an IP monitor daemon.

In block 612, using either internal logic or interfacing with the ISP cloud, the address monitor may identify the network that the device is connected to and determine whether the device is connected to its home network.

In decision block 616, if the device is not connected to the home network, then no further action is necessary, and the process may end.

Returning to decision block 616, if the device is connected to the home network, then the device may need to check whether the IP address has changed. If the IP address has changed, then in block 620, the system updates the IP address. In block 690, the method is done.

Figure 7:
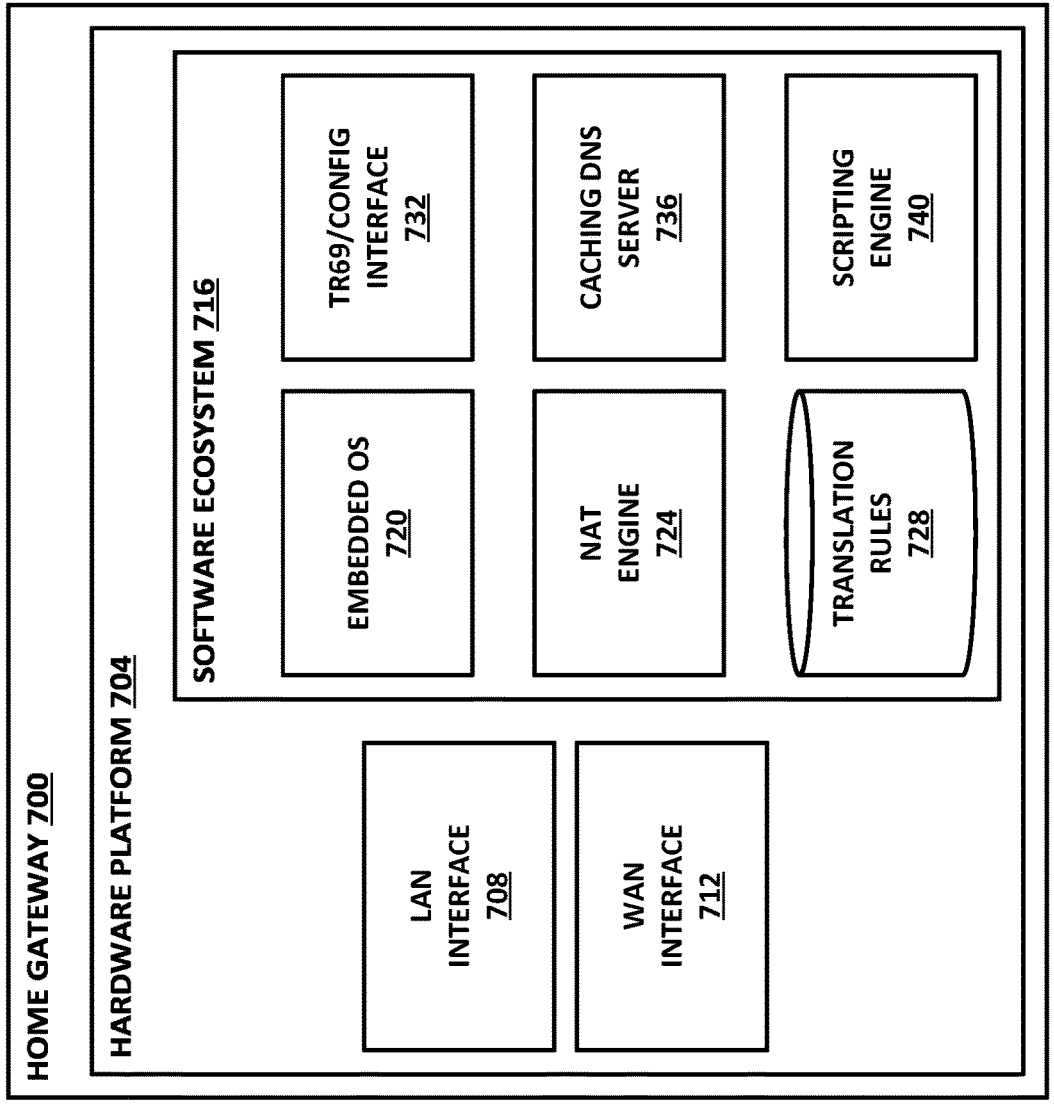
FIG. 7 is a block diagram of a home gateway.

FIG. 7 is a block diagram of a home gateway 700. From the ISP point of view, home gateway 700 may be CPE, an enterprise gateway, or some other gateway. Home gateway 700 may be initially configured using configuration protocols like TR69 with a default DNS destination port called the new device port (NDP). The NDP may be used for sending DNS queries originating from newly connected devices until a separate port has been allocated for that device. The NDP may also be used in the case where a single DNS policy is applied to the whole home network, and it is not necessary to distinguish between individual devices for DNS queries.

In an illustrative example, the ISP may use Auto Configuration Server (ACS) provided by ZCorum to configure the CPE inside the user's home via the TR69 protocol. This configuration may be required to ensure that the cloud service hosted on the ISP network can uniquely identify DNS traffic from the user's home based on the origin device. The unique identification of originating devices is used to enforce device-specific policies, filters, and analytics, by way of illustrative and nonlimiting example. For example, a child's device may have additional protections relative to a parent or adult device. Thus, the ISP cloud service may need to be able to identify traffic originating from the child's device inside a home.

It should also be noted that the ISP-provided CPE does not necessarily act as the gateway for the whole network. For example, many users deploy a third-party Wi-Fi router or other router on their home network behind the ISP-provided CPE. In that case, the effectiveness of the present method may be influenced by the specific configuration. For example, sometimes the CPE provides a pass-through interface, wherein the user's home gateway or Wi-Fi router receives the public IP address of the CPE. In this case, configuration may actually take place on a home router, such as a Wi-Fi router. However, such a third-party Wi-Fi router may not support TR69 or a similar protocol. In that case, the user may need to install additional software on the Wi-Fi router, or alternatively, the ISP may provide configuration files for the subscriber that are compatible with the user's Wi-Fi router to configure the Wi-Fi router's NAT tables.

Fundamentally, almost every home gateway of this type will support NAT in some form, and many of them run custom Linux or BSD-based operating systems. These operating systems often support NAT configuration via simple text files. Therefore, it may be a simple matter of the ISP providing a text file to configure NAT on the home gateway. Alternatively, the ISP could provide a simple helper program that could be installed on the home gateway that receives TR69 configuration instructions. Advantageously, many third-party Wi-Fi routers and other home gateways are more configurable via a web interface than the simpler CPE devices that may be provided by the ISP.

The teachings of this specification may be essentially similar, whether for a Wi-Fi or other router behind a pass-through CPE, or for a CPE that provides services itself.

To enable segregation of DNS traffic for each device across different homes, the CPE may need to be configured in the following way. The CPE may be configured to use the security services provider's DNS forwarder or recursive resolver hosted on the ISP cloud. The DNS forwarder or recursive resolver may be a customized DNS server that is integrated with the policy framework and threat intelligence services, which may be similar to MCAFEE, LLC'S GTI database, or other threat intelligence services.

A script containing forwarding rules may be pushed to the CPE to make sure that destination network address translation (DNAT) is performed on DNS traffic passing through the home gateway, thereby routing the traffic to a different port based on the source MAC address. For example, DNS requests for a first MAC address may be sent to port 10001, those for a second MAC address to may go to port 10002, and so on. This ensures that the DNS server can uniquely identify DNS queries coming from each device, and use those DNS queries to fingerprint the device and enforce device-specific policies, as necessary.

In some embodiments, this can be achieved using IP sets and a mangle table of IP tables. Advantageously, even if the device does not support the TR69 protocol, these can often be configured via simple text files, which can be pushed to the device via the user, or via a small add-on application to support the pushing of these tables.

Another script containing forwarding rules for other protocol traffic may be pushed to the CPE to make sure TCP and UDP traffic from each device passing through the CPE gets the source ports in the specified range for each device. For example, for each TCP or UDP request from a first device, NAT may be used to assign a source port in the range 20001 to 24000. TCP or UDP requests from a second device may be assigned a source port in the range 24001 to 25500, and so on. The size of the source port range may depend on the nature of the device. For example, a simple IoT device that maintains only one or a small number of connections at a time may need only a small port space assignment. A much more full-featured device may maintain many simultaneous network flows and may need a larger address space, and thus, a larger port range.

The assignment of port ranges ensures that inspection engines on the cloud are able to both uniquely identify traffic originating from each device, and to enforce device-specific policies. This can be achieved, for example, using IP sets and a mangle table of IP tables.

As discussed above, the scripts may be pushed and executed remotely using TR69 or an equivalent protocol. In cases where TR69 or similar is not available, other protocols may be used.

By way of architecture, FIG. 7 discloses home gateway 700. Home gateway 700 is hosted on a hardware platform 704. Home gateway 700 includes a local area network (LAN) interface 708 for connecting to the local network, as well as a wide area network (WAN) interface 712 for connecting to a wider network, such as the internet.

Home gateway 700 also includes a software ecosystem 716 hosted on hardware platform 704.

In this illustrative example, software ecosystem 716 includes an embedded operating system 720, a NAT engine 724, translation rules 728, a TR69 or similar configuration interface 732, a caching DNS server 736, and a scripting engine 740.

Embedded operating system (OS) 720 may be an OS commonly used for routers and home gateways. For example, many home gateways are based on Linux-based DD-WRT firmware, the Tomato family of firmware, or custom versions of Linux or BSD. While these are commonly used, this is not to preclude other operating systems, including non-embedded operating systems. For example, a user could choose to use a full-featured server to provide a highly configurable home gateway, which would be compatible with the teachings of the present specification.

NAT engine 724 performs network address translation, according to methods that are known. However, the configuration of NAT engine 724 may be altered to provide the teachings of the present specification.

Translation rules 728 may be a data store of rules for configuring translation. This can include, for example, rules for mapping a particular MAC address to a particular port range, which the NAT engine can then apply according to the current IP address assignment for the device with that MAC address. In some cases, translation rules 728 may be scripts. In other cases, translation rules 728 could be simple text configuration files for a service such as Unix IPtables.

TR69 or configuration interface 732 is an interface that provides communication with the end user or the ISP to receive the initial configuration and configuration updates. If TR69 is not available on the home gateway, other configuration protocols may be used, including pushing text configuration files to the home gateway, or pushing other scripts to the home gateway.

Caching DNS server 736 may be configured to serve the home gateway as the DNS server. However, instead of providing full DNS services, caching DNS server 736 may maintain a cache of recent DNS queries, which may expire on a time to live, such as 24 hours. Caching DNS server 736 may also resolve domain names on the local network. Other nonlocal and non-cached DNS queries may be forwarded to the ISP DNS server, where the ISP's recursive resolver can service the request.

Scripting engine 740 may provide software interfaces for running scripts, which scripts may optionally be included within translation rules 728.

Algorithms provided by home gateway 700 have been described in a textual form, and further description is supported by the flowchart of FIG. 8, and by the signal flow diagrams of FIGS. 16, 17, 18, and 19, below.

Figure 8:
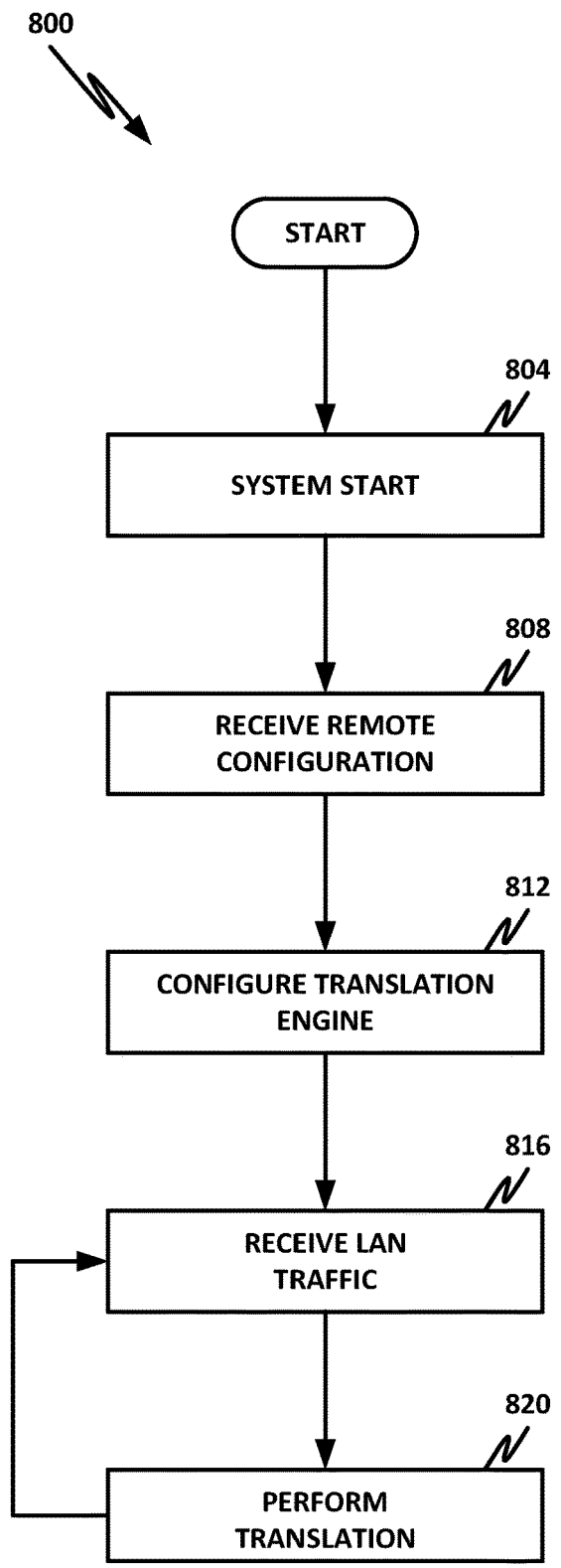
FIG. 8 is a flowchart of a method that may be performed by a home gateway.

FIG. 8 is a flowchart of a method 800. Method 800 may be performed by a home gateway.

Starting in block 804, the system starts up.

In block 808, the system may receive a remote configuration, such as via TR69, text configuration files, or some other similar interface.

In block 812, the system configures the translation engine, which includes the NAT services that provide the port mappings described herein.

In block 816, the system receives LAN traffic.

In block 820, the system performs the translation on the LAN traffic, and then returns to block 816 to listen for more LAN traffic.

Note that the opposite procedure is also supported. On the reverse side, in block 816, the system may receive WAN traffic, such as responses to flows from LAN traffic. In block 820, the system again performs the reverse translation so that endpoint devices receive the expected headers.

Figure 9:
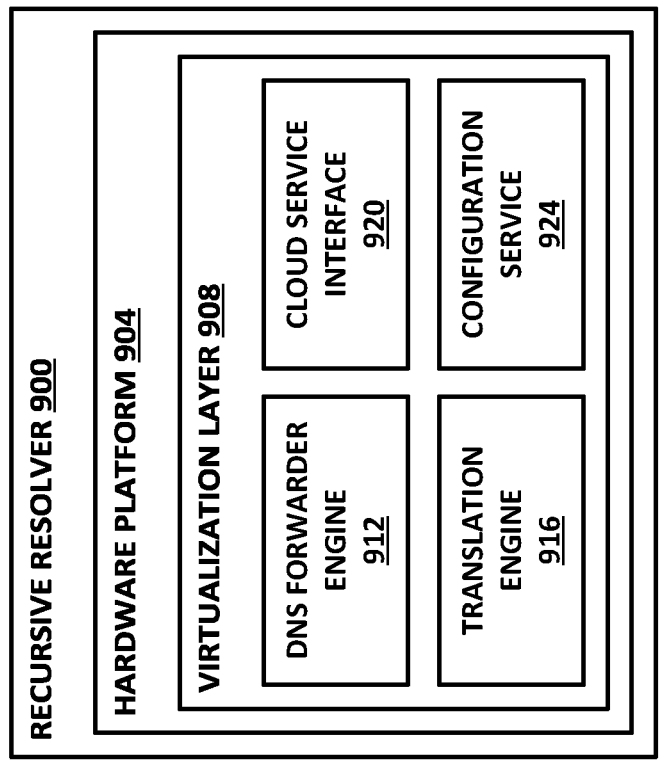
FIG. 9 is a block diagram of a recursive resolver.

FIG. 9 is a block diagram of a recursive resolver 900. Recursive resolver 900 provides important functionality that helps tie together various features of the present specification. Recursive resolver 900 may be, for example, a DNS server that is integrated with a device-specific policy framework and threat intelligence service, such as a threat intelligence service provided by the security services provider. Recursive resolver 900 can then act on DNS queries, based on policy and on response from the threat intelligence network. Based on these actions, the DNS server may drop the request, accept it, or perform some other action such as redirecting, applying some security policy, or any other suitable action.

Notably, recursive resolver 900 does not listen only on the standard DNS port of 53, but listens for DNS queries over a set of ports, such as ports between 10000 and 10200, by way of illustrative and nonlimiting example. The number of ports that recursive resolver 900 listens on is configurable, and may depend on the size of the network. For example, a large enterprise network may have hundreds of devices, and thus recursive resolver 900 may need to listen on hundreds of ports. A small home network may only have up to tens of devices, and in that case, 100 or fewer ports may be sufficient for home networks.

It should be noted that the ports do not need to be unique to the home network. For example, the combination of source IP address (in this case, the public IP address of the home gateway) and port number is sufficient to uniquely identify a device on the home network. Thus, recursive resolver 900 could listen to ports 10000 through 10100 on many different home networks, and still provide unique policies for each device on each home network.

Recursive resolver 900 may receive unique consumer home information from the ISP. The ISP may identify the unique home using the subscriber ID (e.g., point-to-point protocol over Ethernet (PPPoE) authentication), source IP address, or source IP and port combination (in the case where multiple subscribers are sharing the same IP address, or the ISP distributes the port ranges for each subscriber sharing the same IP).

It should also be noted that because the ISP may know which IP address it has assigned to each subscriber, it may not be necessary for the administrative application to perform updates of the IP address as illustrated in block 620 of FIG. 6. The needs of a specific network will depend on a specific deployment and configuration. But in the case that the ISP can provide a reverse lookup that maps the IP address to a specific user, because the ISP owns the DHCP server that assigns the address, client-side updates may not be necessary.

In various embodiments, either the MAC address or the IP address of the endpoint (whichever is more conveniently available to a particular deployment, and makes more sense to that deployment) could be used as an index into a CAM, for example, or a database. The ISP could then use that to look up appropriate policies, port ranges, and other configuration information for the subscriber that maps to that IP address or MAC address.

Figure 11:
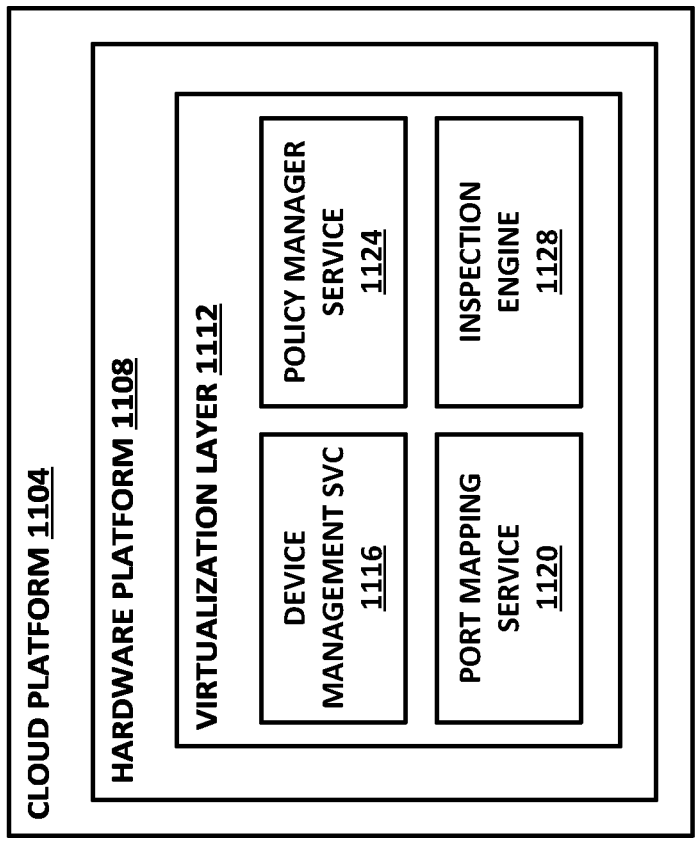
FIG. 11 is a block diagram of a cloud platform.

In applying policy, recursive resolver 900 may get a map of unique devices per consumer home, and which ports will be sending DNS requests from the device management service of, for example, cloud platform 1104 of FIG. 11. Recursive resolver 900 may use this information to segregate requests from each device within a consumer home.

A DNS server of recursive resolver 900 may pass DNS queries to a fingerprinting service or other service running on the cloud, that may use this information to fingerprint the device and identify, for example, its type, manufacturer, make, and model. This is an additional service that may be built to verify the device classification received from the administrative application, and to fingerprint devices that were not fingerprinted earlier.

In one illustrative example, recursive resolver 900 forks DNS queries into two processes. The first process does the actual domain resolution, while the second process gets the reputation and category information from a threat intelligence database. The DNS resolution itself may be performed on recursive resolver 900, or may be offloaded to a separate DNS resolution service.

Based on the policies and response from the cloud-based threat intelligence, recursive resolver 900 can then take appropriate action, such as dropping the DNS request, resolving the DNS request, redirecting the user to a block page, providing an appropriate warning message, or taking some other action as appropriate.

By way of block diagram illustration, recursive resolver 900 includes a hardware platform 904. Hardware platform 904 may provide a processor and memory, as well as a network interface and other peripherals, as necessary.

Optionally, hardware platform 904 may include a virtualization layer 908, which may be used to provide virtual machines, containers, software deployment and package management systems (known as "snaps"), or other segregated guest services.

Virtualization layer 908 hosts several services including, in this example, a DNS engine 912, a translation engine 916, a cloud service interface 920, and a configuration service 924. These may be provided as separate modules within the same physical or virtual guest, or they may be provided as separate guests or services. In general, it should be understood that any of the software modules disclosed throughout this specification may be so divided. They could be provided as separate physical appliances, separate guest services on the same physical appliance, guest services spread across several appliances, or integrated together in any suitable combination.

DNS engine 912 may be either a DNS resolution engine that performs the resolution itself, or an engine that forwards DNS requests to a separate DNS service for final resolution. In either case, DNS engine 912 provides a fully resolved IP address that corresponds to a provided fully qualified domain name (FQDN).

Translation engine 916 may be used to translate the various IP and port assignments that are included within a particular packet. For example, translation engine 916 may look up an IP address provided as the source IP in a packet header, and may look up a port assignment to find an associated port that corresponds to a particular endpoint within the home network. Translation engine 916 may also perform its own NAT, and thus may maintain NAT tables to ensure that IP addresses and port numbers are quickly translated back and forth as traffic flows through the ISP network.

Cloud service interface 920 provides an interface into the cloud service, such as a cloud-based global or enterprise threat intelligence network. This may provide a close coupling between the ISP and the cloud service, which may be two separate physical and/or legal entities. In this case, the cloud service, which may be a security services provider, may partner with the ISP to provide the services described herein.

Configuration service 924 may be a service that is used to program endpoints, such as by operating a TR69 protocol to program endpoints, or providing configuration, lightweight or stub agents or apps for installation on home routers, or other configuration services to program the home gateway to provide the services of the present specification.

Certain algorithms provided by recursive resolver 900 have been described in textual format, and are further disclosed in the flowchart of FIG. 10, and in the signal flow diagrams of FIGS. 16-19, below.

Figure 10:
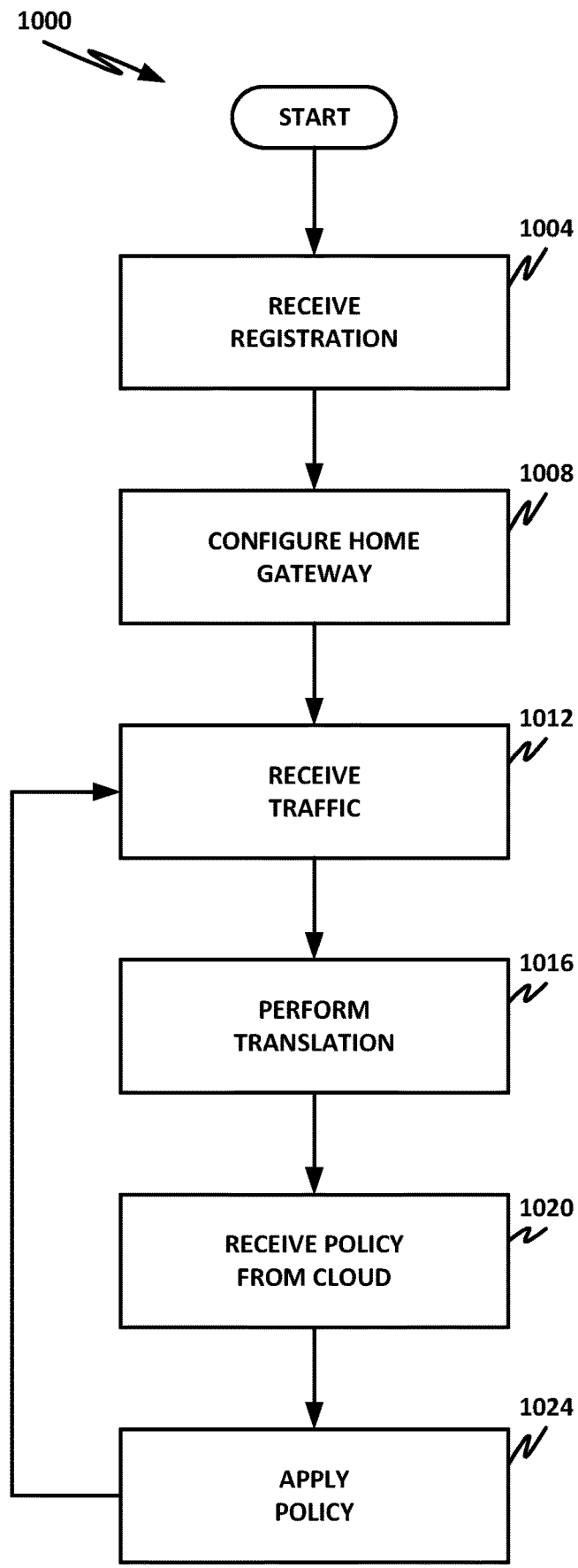
FIG. 10 is a flowchart of a further method.

FIG. 10 is a flowchart of a method 1000. Method 1000 illustrates certain algorithms that may be carried out by modules within recursive resolver 900 of FIG. 9, or by any other suitable engine as disclosed herein.

Starting at block 1004, the system receives a registration request from a home gateway. For example, this may occur when the user first brings the system online, and wants to register with the service.

In block 1008, the system configures the home gateway with the appropriate settings. This configuration may be, for example, via TR69, configuration files, or any other suitable mechanism as disclosed herein.

In block 1012, the system begins receiving traffic from the home gateway. This traffic could be either DNS traffic, or it could be regular internet traffic.

In block 1016, the system performs translation on the traffic, such as by translating IP addresses and/or port numbers, and by looking up associated policies for a user device that corresponds to those IP addresses and/or port numbers. Note that in some cases, this translation may also include NAT performed on the ISP side.

In block 1020, the system may query the cloud service and receive a policy from the cloud. This policy could indicate what should be done with the traffic, whether it should be blocked, whether the user should be warned, whether the traffic should be modified, or whether some other action should be taken.

In block 1024, the system applies the policy to the traffic. The system then continues to receive traffic in block 1012.

FIG. 11 is a block diagram of a cloud platform 1104. Cloud platform 1104 may provide cloud services and one or more inspection engines.

The cloud services may include services like device fingerprinting, port mapping, policy management, device management, one or more L3/L4/L7 inspection engines, or other inspection engines.

In this example, cloud platform 1104 includes a hardware platform 1108, which may include one or more processors, memory, network interfaces, and other hardware. Hardware platform 1108 could also include accelerators, and other hardware elements.

By way of illustration, hardware platform 1108 may include a virtualization layer 1112 which may, for example, provide guest services for virtualization, containers, snaps, or other guest services.

In this embodiment, hosted on virtualization layer 1112 are several services, including a device management service 1116, a port mapping service 1120, a policy manager service 1124, and an inspection engine 1128.

By way of illustrative and nonlimiting example, device management service 1116 interacts with an administrative application operated by the home user, and maintains a list of devices connected to the home network. It may also interact with a port mapping service to allocate a unique DNS destination port for each device, if desired for the particular embodiment. The device management service may then interact with the ISP configuration service to configure the home gateway with a unique set of DNS ports for each device in the home. The device management service may also share the device to the destination port number mapping with the DNS server, such as recursive resolver 900 of FIG. 9. This helps the DNS server to segregate traffic from different devices.

Port mapping service 1120 may be responsible for maintaining and allocating unique DNS destination ports for each device within the home network. It may also reuse the same port values across different homes for scalability. In those cases, a home gateway may be uniquely identified by its IP address and/or MAC address, in combination with a DNS port number. A device connected to a home gateway may be uniquely identified by a combination of the IP address and a port assigned to that device for DNS.

Port mapping service 1120 may also be responsible for allocating and maintaining per-device port ranges for segregating other traffic, including TCP and UDP traffic originating from the different devices. For example, a device A from a home gateway may be assigned the port range of 4000 through 8000 for all of its TCP and UDP communications, while device B in the same home gateway may be assigned the port range of 9000 through 11000, by way of illustrative and nonlimiting example.

Policy manager service 1124 may be responsible for maintaining device-specific policies for each home. The policy manager may share policy details with other services, like the DNS server and L3/L4/L7 inspection engines, which may act based on conditions and criteria defined in the policy. The policy may be updated by the administrative application of the end user, which allows the user to edit, modify, enable, disable, or otherwise affect the policy application for any device.

A typical policy may include, as an illustrative and nonlimiting example: for device A in the user's home, block access to adult sites, dating sites, and social media sites. The policy could also be, for example: for device B in the same home gateway, allow all traffic, but inspect and block any TLS communication that uses a revoked certificate.

There may also be provided a pluggable framework to provide a number of inspection engines such as, by way of illustrative and nonlimiting example, L3, L4, and/or L7 inspection engines. These may be provided as inspection engines 1128.

These inspection engines may be, by way of illustration, a layer-wise traffic inspection engine intended for on-path inspection of protocol traffic, to check for potential security and privacy issues in the ongoing communication.

In one illustrative example, a TLS inspection engine may inspect the TLS handshake to identify and block flows that are using self-signed certificates, or revoked certificates. Many other inspection engines may be provided, and many such engines are known. These inspection engines may be pluggable components, and can be either enabled or not for a specific user or device based on policy and subscription.

In the foregoing, certain modules of cloud platform 1104 of FIG. 11 include algorithms that have been described in a textual format. FIGS. 12-15 and the signal flow diagrams of FIGS. 16-19 provide additional support for certain aspects of these algorithms.

Figure 12:
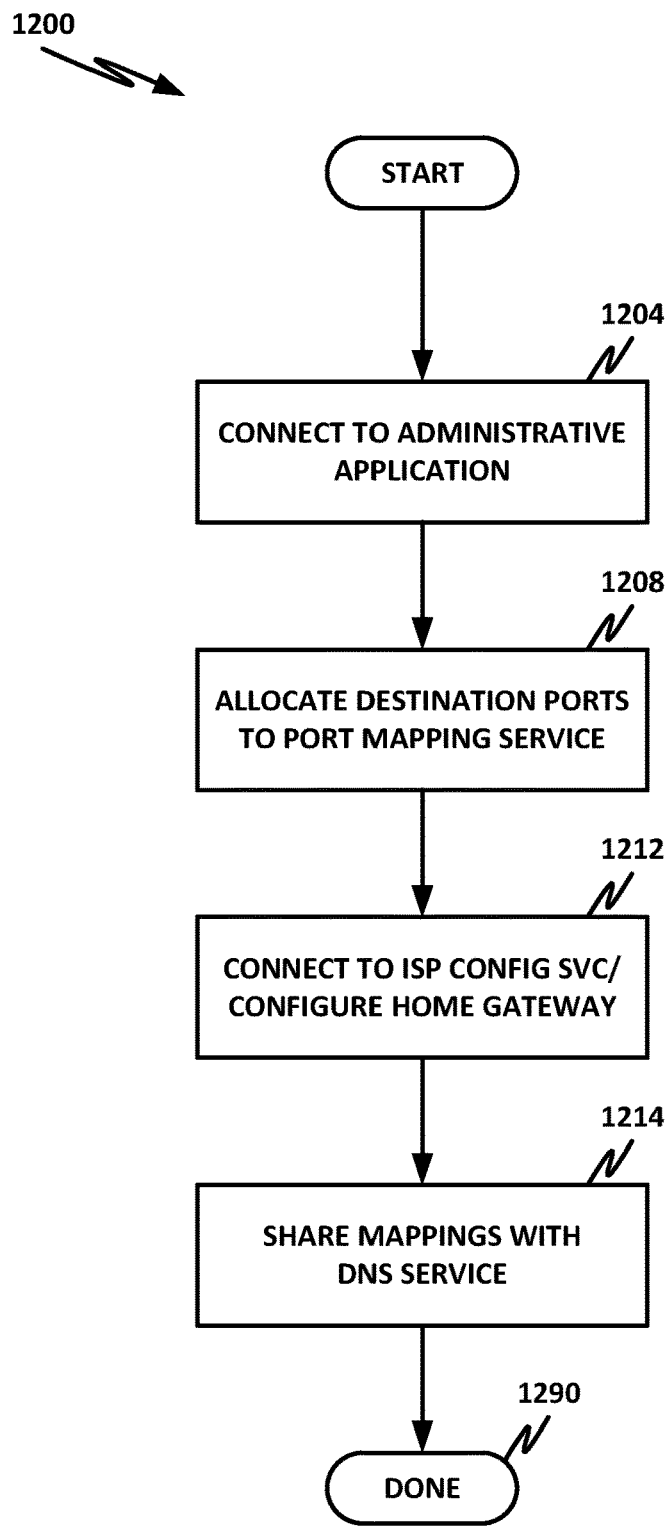
FIGS. 12-15 are flowcharts of additional further methods according to the teachings of the present specification.

FIG. 12 is a flowchart of a method 1200. Method 1200 may be performed, by way of illustrative and nonlimiting example, by device management service 1116 of FIG. 11.

Starting in block 1204, the system connects to an administrative application, such as administrative application 416 on an administrative device 400, as illustrated in FIG. 4.

In block 1208, the system allocates destination ports to the port mapping service.

In block 1212, the system may connect to the ISP configuration service to configure the home gateway. This enables the ISP to configure the home gateway, such as via TR69, configuration files, or otherwise.

In block 1214, the system may then share the mappings with the DNS service, so that they can be acted on appropriately.

In block 1290, the method is done.

Figure 13:
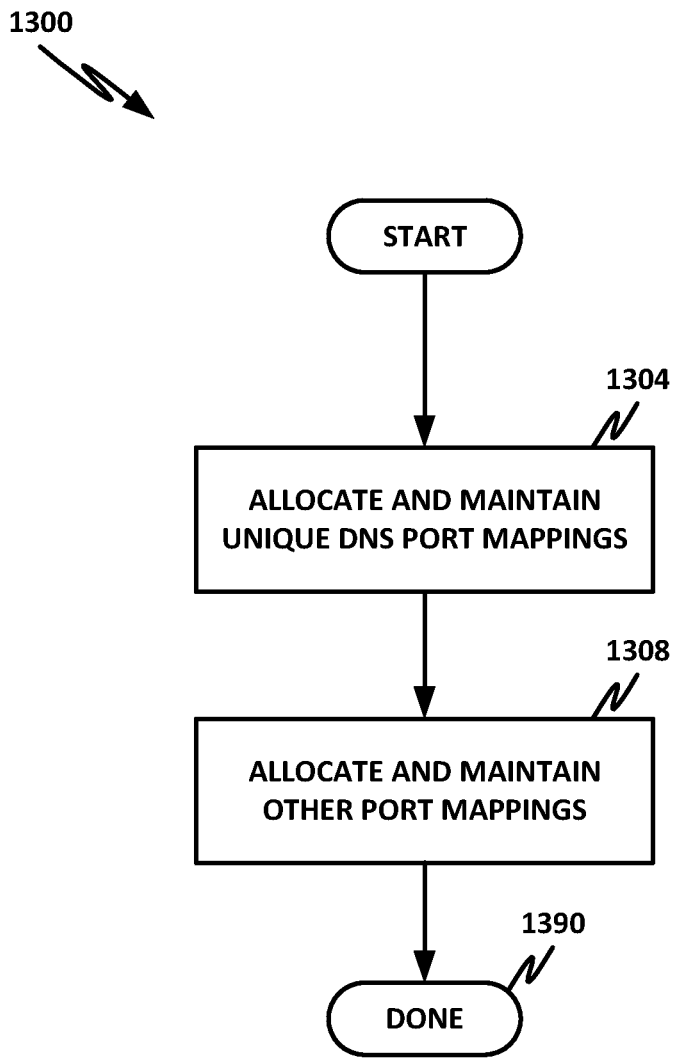

FIG. 13 is a flowchart of a method 1300. In one embodiment, method 1300 may be performed by port mapping service 1120 of FIG. 11.

In block 1304, the system allocates and maintains unique DNS port mappings for each home gateway and/or for each individual device on the home gateway.

In block 1308, the system may also allocate and maintain other port mappings, such as device-specific port mappings for individual devices on the network.

In block 1390, the method is done.

Figure 14:
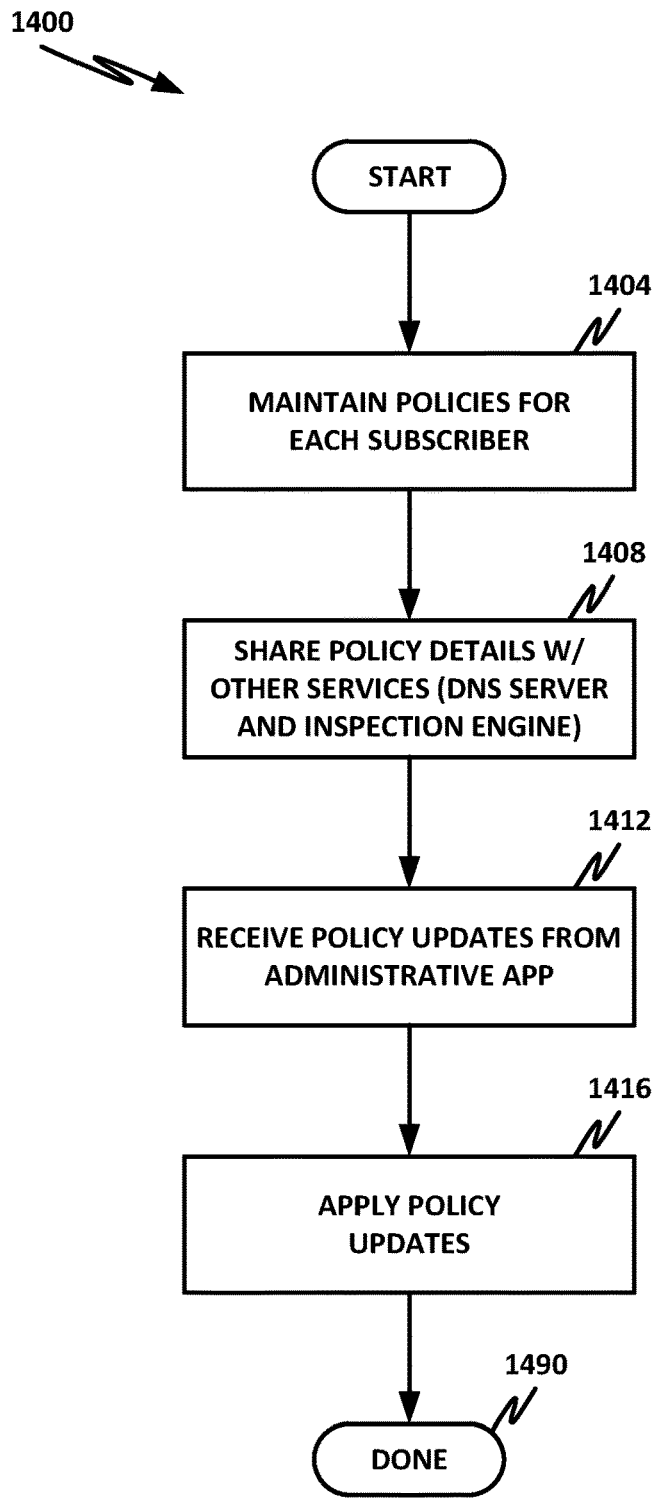

FIG. 14 is a flowchart of a method 1400. Method 1400 may be performed, for example, by policy manager service 1124 of FIG. 11.

Starting in block 1404, the system maintains policies for each subscriber and/or policies for each individual device on the subscriber's network.

In block 1408, the system may share policy details with other services including, by way of illustrative and nonlimiting example, the DNS server and the inspection engines.

In block 1412, the system may periodically receive policy updates from the administrative application, for example, when the user wants to change or update policies.

In block 1416, the system applies the policy updates that were received from the end user. These policies can then be activated and acted upon by other agents.

In block 1490, the method is done.

Figure 15:
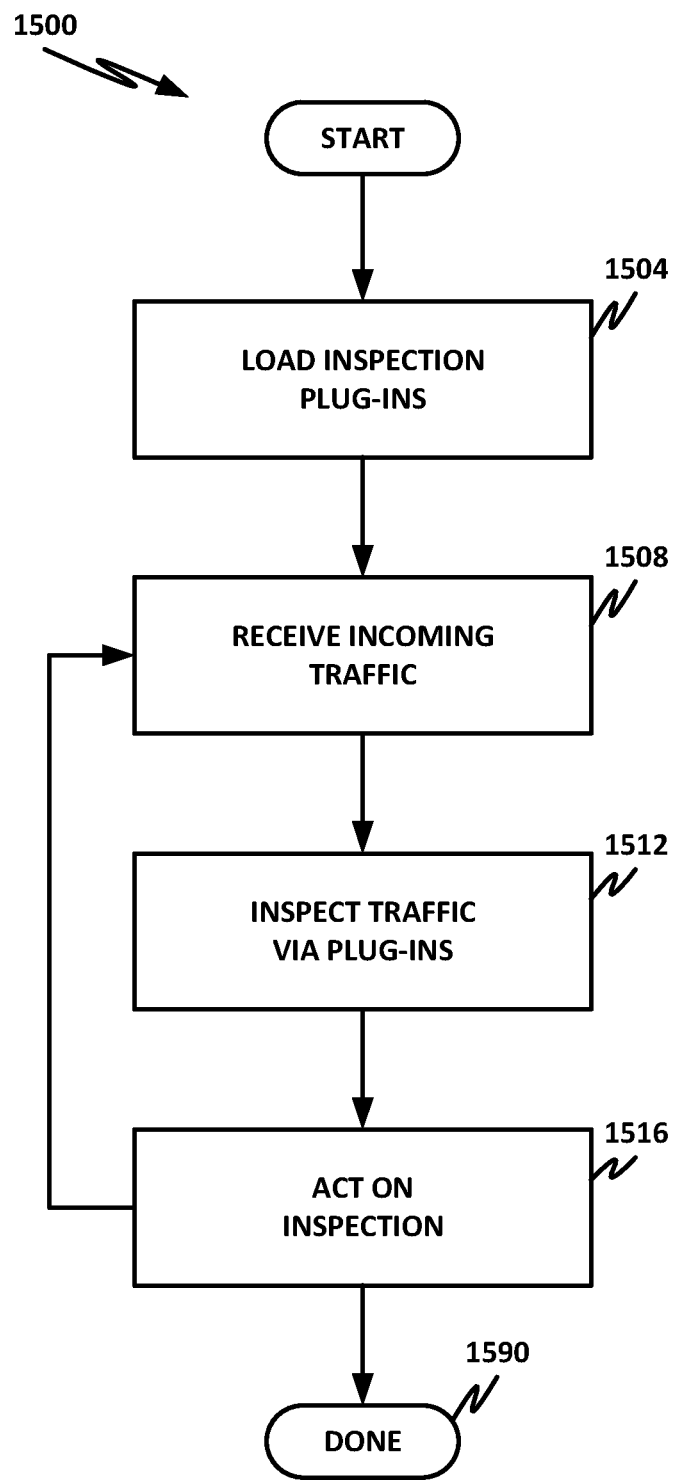

FIG. 15 is a flowchart of a method 1500. Method 1500 may be performed, for example, by inspection engines 1128 of FIG. 11.

As noted above, inspection engines may be part of a pluggable framework. Thus, in block 1504, the system loads the inspection plug-ins, which provides a number of inspection engines.

In block 1508, the system receives incoming traffic, or alternatively, metadata about incoming traffic, such as header information that indicates the source IP, the destination IP, the source port, the destination port, and the protocol.

The traffic or the metadata about the traffic may be used to look up policies for individual subscribers and/or individual devices.

In block 1512, the engine may inspect the traffic via plug-ins. This could include applying policies based on header information, or could include deep packet inspection of traffic or other inspection engines, including L3/L4/L7 inspection engines, by way of illustrative and nonlimiting example.

In block 1516, the inspection engine may act on the inspection, including applying a policy to the packet, or notifying other engines or agents of actions to be taken on the packet. The system may then continue to receive incoming traffic in block 1508.

In block 1590, the method is done.

FIG. 16 is a signal flow diagram. The signal flow diagram of FIG. 16 provides certain algorithms according to the teachings of the present specification. These algorithms are provided by an administrative application 1604, a CPE such as a home gateway 1608, a DNS forwarder or recursive resolver 1612, and an ISP cloud management service 1616.

At operation 1, administrative application 1604 detects that it is connected to the home network, and signals to home gateway 1608 that it is connected to the home network.

At operation 2, alternatively, administrative application 1604 may query home gateway 1608 to determine whether it is connected to the home network, and a response from home gateway 1608 indicates that it is connected to the home network.

At operation 3, administrative application 1604 performs a periodic scan of the home network, by communicating with home gateway 1608 to determine attached devices.

At operation 4, home gateway 1608 may return a list of attached devices.

At operation 5, administrative application 1604 communicates with ISP cloud management service 1616 to update the device list and properties for the ISP cloud.

At operation 6, ISP cloud service 1616 may notify other services of the provided updates as necessary.

At operation 7, home gateway 1608 may receive a DNS request for a new device, and forwards the DNS request to DNS forwarder 1612.

At operation 8, DNS forwarder 1612 notifies ISP cloud service 1616 of a newly identified device.

At operation 9, DNS forwarder 1612 provides a DNS response to home gateway 1608.

At operation 10, having determined that a new device is connected to the network, ISP cloud service 1616 initiates a home network scan request to administrative application 1604.

At operation 11, administrative application 1604 initiates a home network detection with home gateway 1608.

At operation 12, home gateway 1608 indicates to administrative application 1604 that it is connected to the home network.

At operation 13, administrative application 1604 initiates a home network on-demand scan. This includes sending a signal to home gateway 1608 to scan the home network.

At operation 14, home gateway 1608 returns a scan of the home network, including the newly identified device.

At operation 15, administrative application 1604 updates the device list and properties for the ISP cloud 1616.

At operation 16, ISP cloud 1616 may notify other services of the updates as necessary.

Figure 17:
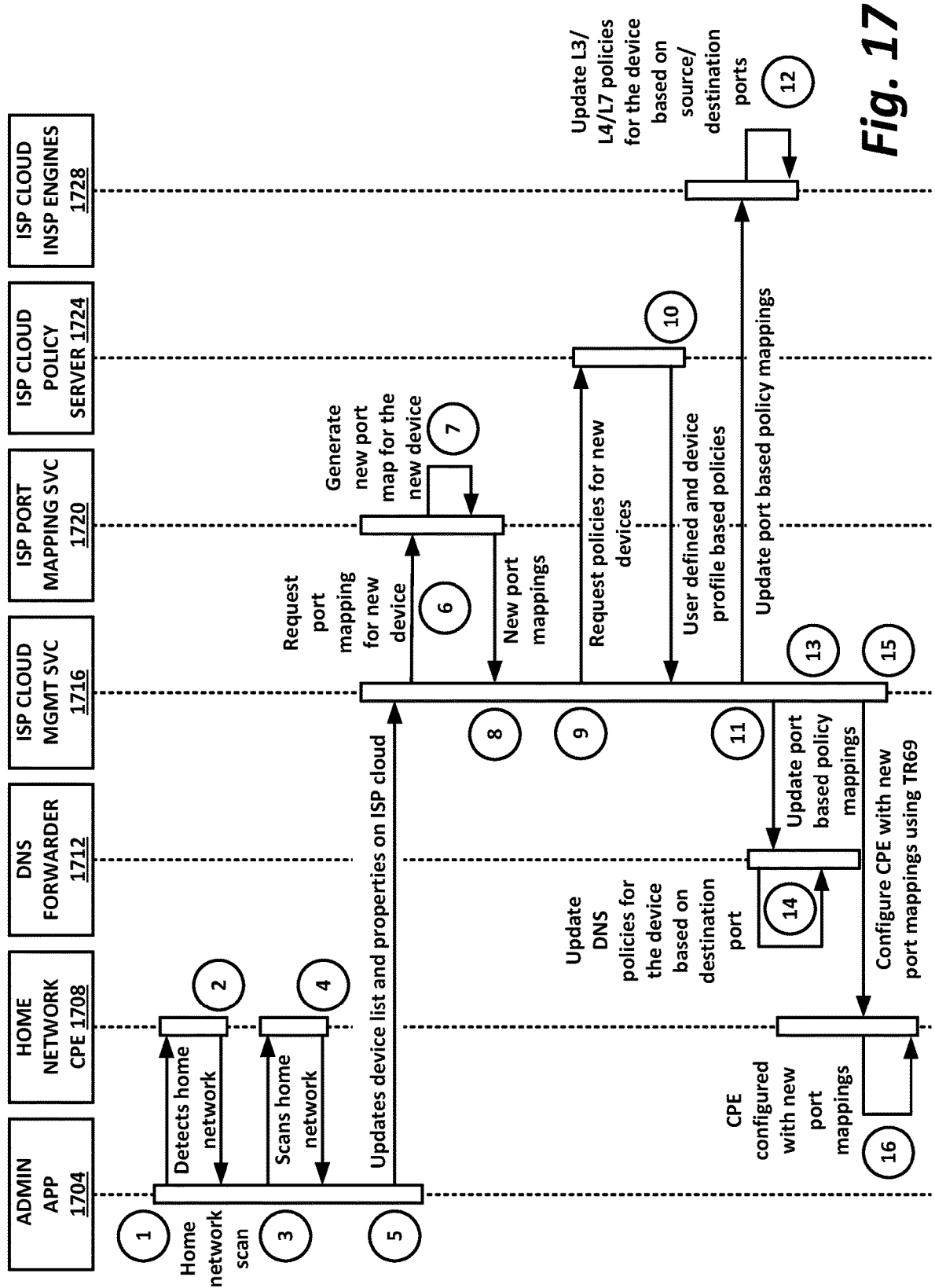

FIG. 17 is a signal flow diagram. The signal flow diagram of FIG. 17 provides certain algorithms according to the teachings of the present specification. In this case, the algorithms are provided by administrative application 1704, home gateway 1708, DNS forwarder 1712, ISP cloud service 1716, ISP port mapping service 1720, ISP cloud policy server 1724, and ISP cloud inspection engines 1728.

At operation 1, administrative application 1704 initiates a detection of the home network with home gateway 1708.

At operation 2, home gateway 1708 notifies administrative application 1704 that it is connected to the home gateway.

At operation 3, administrative application 1704 initiates a scan of the home network with home gateway 1708.

At operation 4, home gateway 1708 returns a list of connected devices to administrative application 1704.

At operation 5, administrative application 1704 updates the device list and properties to ISP cloud service 1716.

At operation 6, ISP cloud service 1716 requests a port mapping for a newly identified device or devices from port mapping service 1720.

At operation 7, port mapping service 1720 generates a new port map for the newly identified device or devices.

At operation 8, port mapping service 1720 returns to ISP cloud service 1716 the new port mapping or mappings.

At operation 9, ISP cloud service 1716 requests policies for the new device from ISP cloud policy server 1724.

At operation 10, cloud policy server 1724 provides the user-provided or user-defined device profile for the newly identified device. Cloud policy server 1724 may have previously received this policy or device profile from an administrative application 1704.

At operation 11, device management service 1716 updates the port-based policy mappings to inspection engines 1728.

At operation 12, inspection engines 1728 update the L3/L4/L7 or other policies for the device based on source or destination ports.

At operation 13, device management service 1716 updates the port-based policy mappings to DNS forwarder 1712.

At operation 14, DNS forwarder 1712 updates the DNS policies for the device based on the destination port.

At operation 15, device management service 1716 configures the CPE with new port mappings using, for example, TR69, configuration files, or similar.

At operation 16, home gateway 1708 is configured with the new port mappings.

Figure 18:
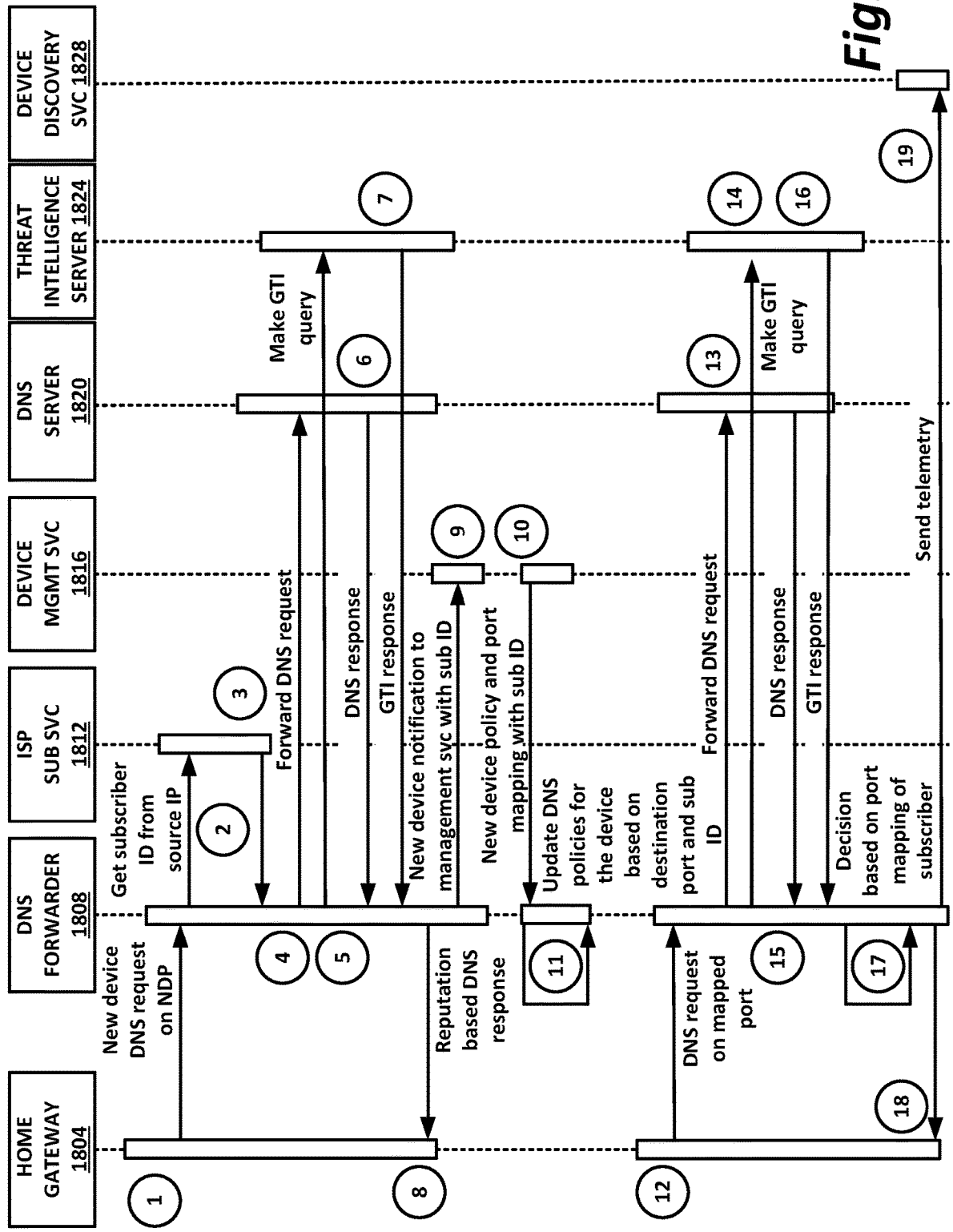

FIG. 18 is a signal flow diagram. The signal flow diagram of FIG. 18 provides certain algorithms according to the teachings of the present specification. These algorithms are provided, for example, by a home gateway 1804, DNS forwarder 1808, ISP subscription service 1812, device management service 1816, DNS server 1820, threat intelligence server 1824, and device discovery service 1828.

At operation 1, home gateway 1804 provides a new DNS request via NDP to DNS forwarder 1808.

At operation 2, DNS forwarder 1808 gets the subscriber ID from subscription service 1812 based, for example, on the source IP.

At operation 3, subscription service 1812 returns the appropriate subscriber ID to DNS forwarder 1808.

At operation 4, DNS forwarder 1808 forwards the DNS request to DNS server 1820.

At operation 5, DNS forwarder 1808 also makes a query to threat intelligence server 1824.

At operation 6, DNS server 1820 provides a DNS response to DNS forwarder 1808.

At operation 7, threat intelligence server 1824 provides a threat intelligence response to DNS forwarder 1808. This threat intelligence response could indicate, for example, whether the domain is dangerous, what the domain's reputation is, or other information about the domain.

At operation 8, DNS forwarder 1808 provides a reputation-based DNS response to home gateway 1804. This reputation response could, for example, include a rich DNS response with additional information about the requested domain name.

At operation 9, if a device is newly identified, then DNS forwarder 1808 may also provide a new device notification to the management service with the subscriber ID to device management service 1816.

At operation 10, device management service 1816 provides to DNS forwarder 1808 a new device policy and port mapping with the subscriber ID.

At operation 11, DNS forwarder 1808 updates its DNS policies for the device based on the destination port and subscriber ID.

At operation 12, home gateway 1804 provides a DNS request on the mapped port to DNS forwarder 1808.

At operation 13, based on the mapped port, DNS forwarder 1808 forwards the DNS request to DNS server 1820.

At operation 14, DNS forwarder 1808 also makes a threat intelligence query to threat intelligence service 1824.

At operation 15, DNS server 1820 provides a DNS response to DNS forwarder 1808.

At operation 16, threat intelligence service 1824 provides a threat intelligence response to DNS forwarder 1808.

At operation 17, DNS forwarder 1808 may make a decision based on the port policy mapping of the subscriber.

At operation 18, DNS forwarder 1808 may provide back to home gateway 1804 a policy and reputation-based filtered DNS response.

At operation 19, DNS forwarder 1808 may provide telemetry to device discovery service 1828, which can be used to further refine or improve device discovery services. For example, telemetry data about devices may be aggregated so that new devices can be more fully identified in the future.

Figure 19:
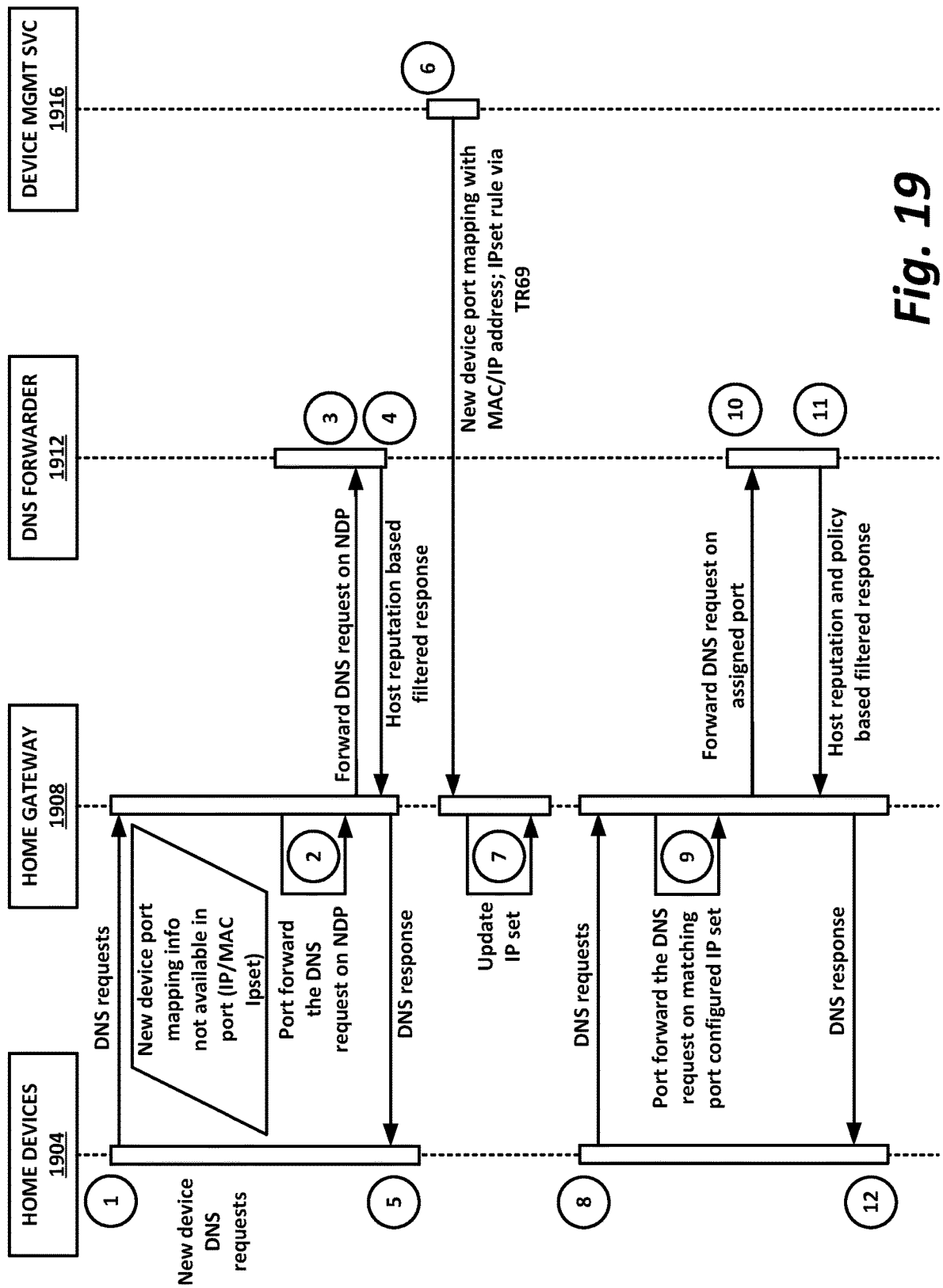

FIG. 19 is a signal flow diagram. The signal flow diagram of FIG. 19 provides certain algorithms according to the teachings of the present specification. By way of example, the algorithms may be provided on home devices 1904, home gateway 1908, DNS forwarder 1912, and device management service 1916.

At operation 1, a home device 1904 provides a DNS request to home gateway 1908. At this point, if home device 1904 is a new device, then the NDP mapping information will not be available in the port to IP/MAC IP tables or IP set.

At operation 2, home gateway 1908 forwards the DNS request via NDP.

At operation 3, home gateway 1908 provides the forwarder DNS request on NDP to DNS forwarder 1912.

At operation 4, DNS forwarder 1912 provides a host reputation-based filtered response to the DNS request.

At operation 5, home gateway 1908 provides a DNS response to home device 1904.

At operation 6, device management service 1916 may provide NDP mappings with MAC and IP address for an IP set rule, for example, via TR69 or similar.

At operation 7, home gateway 1908 may update its IP set internally.

At operation 8, a home device 1904 provides a new DNS request to home gateway 1908.

At operation 9, home gateway 1908 port forwards the DNS request on the matching port of the IP set as configured.

At operation 10, home gateway 1908 forwards the modified DNS request on the assigned port to DNS forwarder 1912.

At operation 11, DNS forwarder 1912 provides a host reputation and policy-based filtered response to home gateway 1908.

At operation 12, home gateway 1908 provides the appropriate DNS response to home device 1904.

Figure 20:
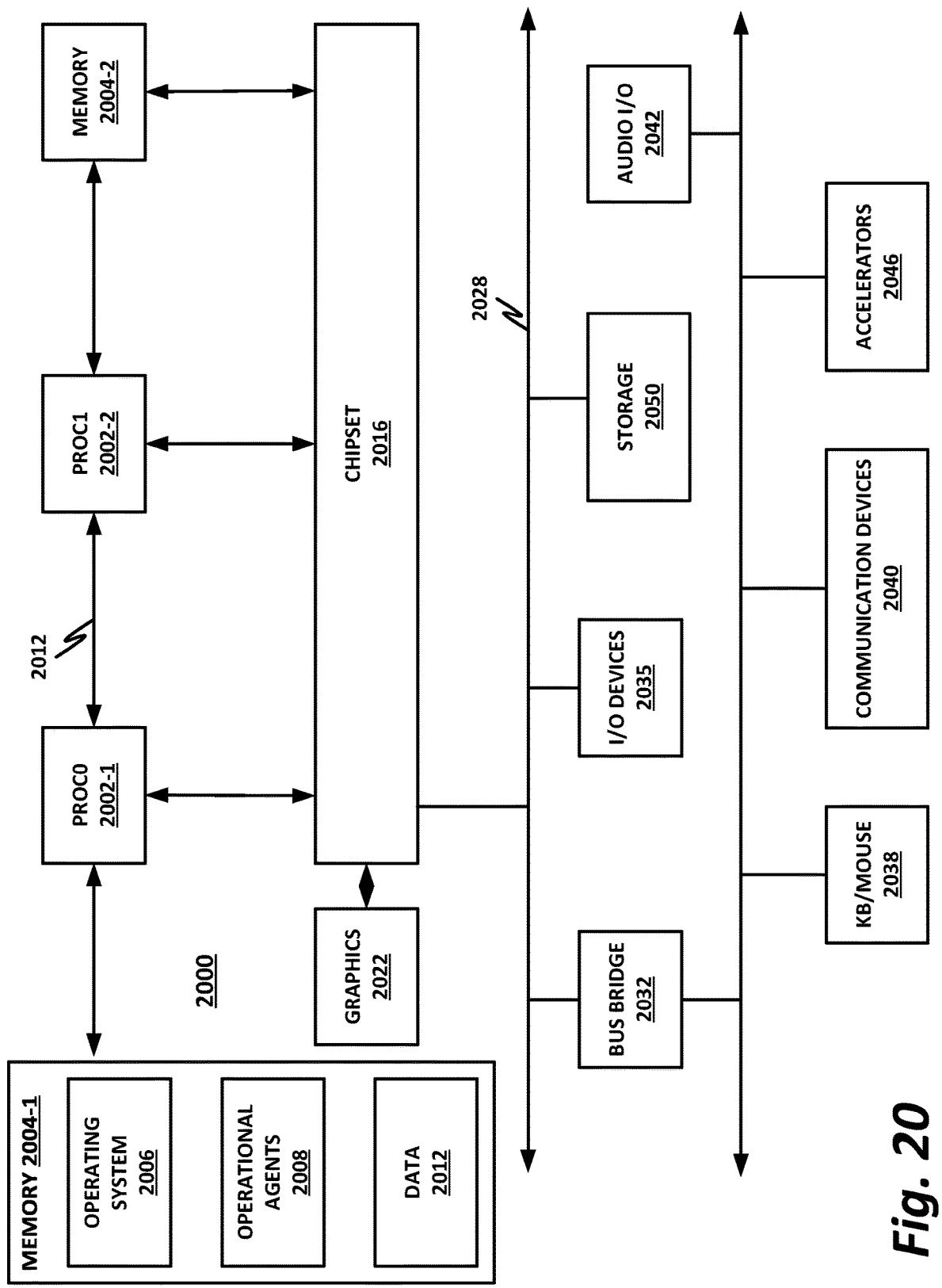
FIG. 20 is a block diagram of selected elements of a hardware platform.

FIG. 20 is a block diagram of a hardware platform 2000.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 2000, even though they may be scattered across a data center, or even located in different data centers.

Hardware platform 2000 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 2000 is arranged in a point-to-point (PtP) configuration. This PtP configuration is popular for PC and server-type devices, although it is not so limited, and any other bus type may be used.

Hardware platform 2000 is an example of a platform that may be used to implement embodiments of the teachings of this specification. For example, instructions could be stored in storage 2050. Instructions could also be transmitted to the hardware platform in an ethereal form, such as via a network interface, or retrieved from another source via any suitable interconnect. Once received (from any source), the instructions may be loaded into memory 2004, and may then be executed by one or more processor 2002 to provide elements such as an operating system 2006, operational agents 2008, or data 2012.

Figure 22:
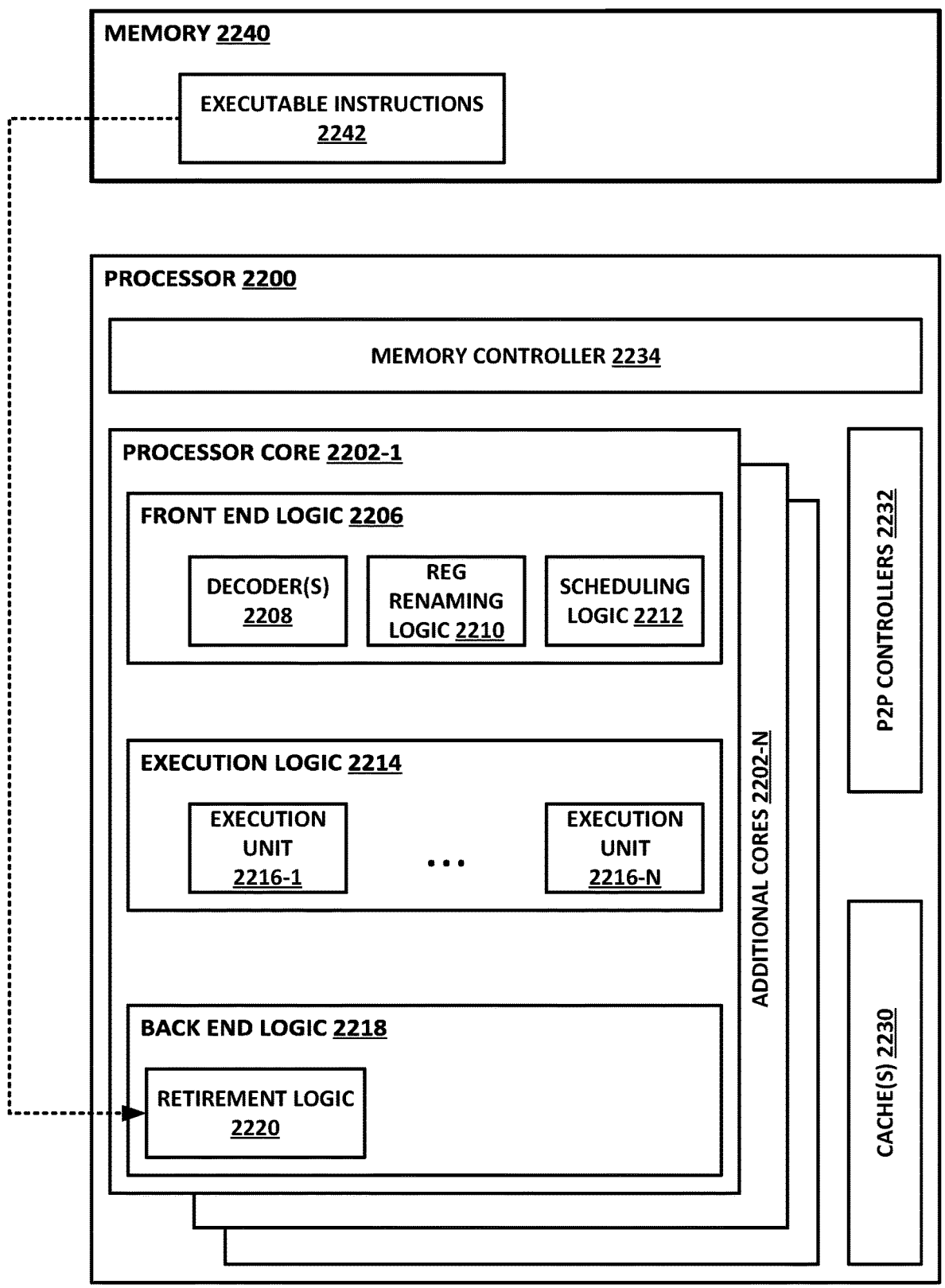
FIG. 22 is a block diagram of selected elements of a processor.

Hardware platform 2000 may include several processors 2002. For simplicity and clarity, only processors PROC0 2002-1 and PROC1 2002-2 are shown. Additional processors (such as 2, 4, 8, 16, 24, 32, 64, or 128 processors) may be provided as necessary, while in other embodiments, only one processor may be provided. Details of processors 2002 are not illustrated in this FIGURE, but one embodiment is illustrated in FIG. 22. Processors may have any number of cores, such as 1, 2, 4, 8, 16, 24, 32, 64, or 128 cores.

Processors 2002 may be any type of processor and may communicatively couple to chipset 2016 via, for example, PtP interfaces. Chipset 2016 may also exchange data with other elements, such as a high performance graphics adapter 2022. In alternative embodiments, any or all of the PtP links illustrated in FIG. 20 could be implemented as any type of bus, or other configuration rather than a PtP link. In various embodiments, chipset 2016 may reside on the same die or package as a processor 2002 or on one or more different dies or packages. Each chipset may support any suitable number of processors 2002. A chipset 2016 (which may be a chipset, uncore, Northbridge, Southbridge, or other suitable logic and circuitry) may also include one or more controllers to couple other components to one or more central processor units (CPUs).

Two memories, 2004-1 and 2004-2 are shown, connected to PROC0 2002-1 and PROC1 2002-2, respectively. As an example, each processor is shown connected to its memory in a direct memory access (DMA) configuration, though other memory architectures are possible, including ones in which memory 2004 communicates with a processor 2002 via a bus. For example, some memories may be connected via a system bus, or in a data center, memory may be accessible in a remote DMA (RDMA) configuration.

Memory 2004 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 2004 may be used for short, medium, and/or long-term storage. Memory 2004 may store any suitable data or information utilized by platform logic. In some embodiments, memory 2004 may also comprise storage for instructions that may be executed by the cores of processors 2002 or other processing elements (e.g., logic resident on chipsets 2016) to provide functionality.

In certain embodiments, memory 2004 may comprise a relatively low-latency volatile main memory, while storage 2050 may comprise a relatively higher-latency non-volatile memory. However, memory 2004 and storage 2050 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 2004 and storage 2050, for example, in a single physical memory device, and in other cases, memory 2004 and/or storage 2050 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 2022 may be configured to provide a human-readable visual output, such as a command-line interface (CLI) or graphical desktop such as Microsoft Windows, Apple OS X desktop, or a Unix/Linux X Window System-based desktop. Graphics adapter 2022 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 2022 may include a hardware graphics card, which may have its own memory and its own graphics processing unit (GPU).

Chipset 2016 may be in communication with a bus 2028 via an interface circuit. Bus 2028 may have one or more devices that communicate over it, such as a bus bridge 2032, I/O devices 2035, accelerators 2046, communication devices 2040, and a keyboard and/or mouse 2038, by way of nonlimiting example. In general terms, the elements of hardware platform 2000 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 2040 can broadly include any communication not covered by a network interface and the various I/O devices described herein. This may include, for example, various universal serial bus (USB), FireWire, Lightning, or other serial or parallel devices that provide communications.

I/O Devices 2035 may be configured to interface with any auxiliary device that connects to hardware platform 2000 but that is not necessarily a part of the core architecture of hardware platform 2000. A peripheral may be operable to provide extended functionality to hardware platform 2000, and may or may not be wholly dependent on hardware platform 2000. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 2042 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 2032 may be in communication with other devices such as a keyboard/mouse 2038 (or other input devices such as a touch screen, trackball, etc.), communication devices 2040 (such as modems, network interface devices, peripheral interfaces such as PCI or PCIe, or other types of communication devices that may communicate through a network), audio I/O 2042, and/or accelerators 2046. In alternative embodiments, any portions of the bus architectures could be implemented with one or more PtP links.

Operating system 2006 may be, for example, Microsoft Windows, Linux, UNIX, Mac OS X, iOS, MS-DOS, or an embedded or real-time operating system (including embedded or real-time flavors of the foregoing). In some embodiments, a hardware platform 2000 may function as a host platform for one or more guest systems that invoke application (e.g., operational agents 2008).

Operational agents 2008 may include one or more computing engines that may include one or more non-transitory computer-readable mediums having stored thereon executable instructions operable to instruct a processor to provide operational functions. At an appropriate time, such as upon booting hardware platform 2000 or upon a command from operating system 2006 or a user or security administrator, a processor 2002 may retrieve a copy of the operational agent (or software portions thereof) from storage 2050 and load it into memory 2004. Processor 2002 may then iteratively execute the instructions of operational agents 2008 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 2000 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a LAN, metropolitan area network (MAN), WAN, wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 2000 may be virtualized, in particular the processor(s) and memory. For example, a virtualized environment may run on OS 2006, or OS 2006 could be replaced with a hypervisor or virtual machine manager. In this configuration, a virtual machine running on hardware platform 2000 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 20 may be combined in an SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 21. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 21:
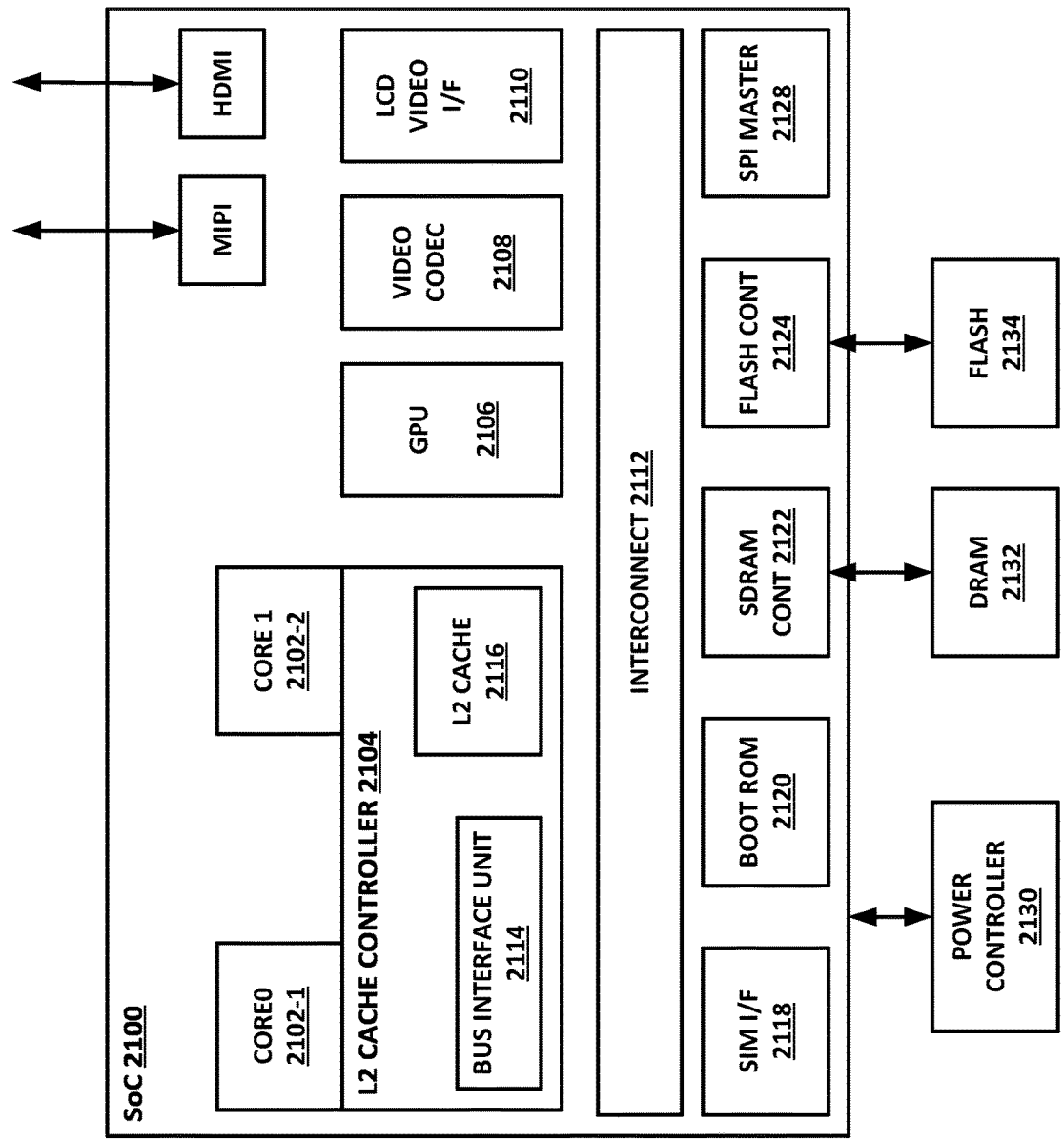
FIG. 21 is a block diagram of selected elements of a system-on-a-chip (SoC).

FIG. 21 is a block illustrating selected elements of an example SoC 2100. At least some of the teachings of the present specification may be embodied on an SoC 2100, or may be paired with an SoC 2100. SoC 2100 may include, or may be paired with, an advanced reduced instruction set computer machine (ARM) component. For example, SoC 2100 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 2100 could also be integrated into, for example, a PC, server, video processing components, laptop computer, notebook computer, netbook, or touch-enabled device.

As with hardware platform 2000 above, SoC 2100 may include multiple cores 2102-1 and 2102-2. In this illustrative example, SoC 2100 also includes an L2 cache control 2104, a GPU 2106, a video codec 2108, a liquid crystal display (LCD) I/F 2110 and an interconnect 2112. L2 cache control 2104 can include a bus interface unit 2114, a L2 cache 2116. Liquid crystal display (LCD) I/F 2110 may be associated with mobile industry processor interface (MIPI)/HDMI links that couple to an LCD.

SoC 2100 may also include a subscriber identity module (SIM) I/F 2118, a boot ROM 2120, a synchronous dynamic random access memory (SDRAM) controller 2122, a flash controller 2124, a serial peripheral interface (SPI) master 2128, a suitable power control 2130, a dynamic RAM (DRAM) 2132, and flash 2134. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 2100 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 22 is a block diagram illustrating selected elements of a processor 2200. In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 2200 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special-purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via NFV, and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple VMs are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 2200 includes one or more processor cores 2202, including core 2202-1-2202-N. Cores 2202 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 2200 may include at least one shared cache 2230, which may be treated logically as part of memory 2240. Memory 2240 may include executable instructions 2242, as illustrated. Caches 2230 may be filled according to known caching techniques, and may store instructions and/or data that may be used by one or more components of processor 2200.

Processor 2200 may include an integrated memory controller (MC) 2234, to communicate with memory 2240. Memory controller 2234 may include logic and circuitry to interface with memory 2240, and may also include a cache controller to handle filling and evicting instructions and data to and from cache 2230.

By way of example, each core 2202 may include front-end logic 2206, execution logic 2214, and backend logic 2218.

In the illustrated embodiment, front-end logic 2206 includes an instruction decoder or decoders 2208, register renaming logic 2210, and scheduling logic 2212. Decoder 2208 may decode instructions received. Register renaming logic 2210 may provide register renaming, for example to facilitate pipelining. Scheduling logic 2212 may schedule instruction execution, and may provide out-of-order (OOO) execution. Front-end logic 2206 may fetch incoming instructions, perform various processing (e.g., caching, decoding, branch predicting, etc.), and pass instructions to execution logic 2214.

Execution logic 2214 includes one or more execution units 2216-1-2216-N. Execution units 2216 may include hardware instructions and microcode to carry out the provided instructions.

Backend logic 2218 includes retirement logic 2220. Core 2202 may provide for speculative execution of instructions, branch prediction, and similar. Retirement logic 2220 may be configured to determine which predicted instructions were actually needed by the program flow.

Processor 2200 may also include a PtP controller 2232, which enables connection to an uncore, chipset, Northbridge, Southbridge, or bus, by way of example.

Figure 23:
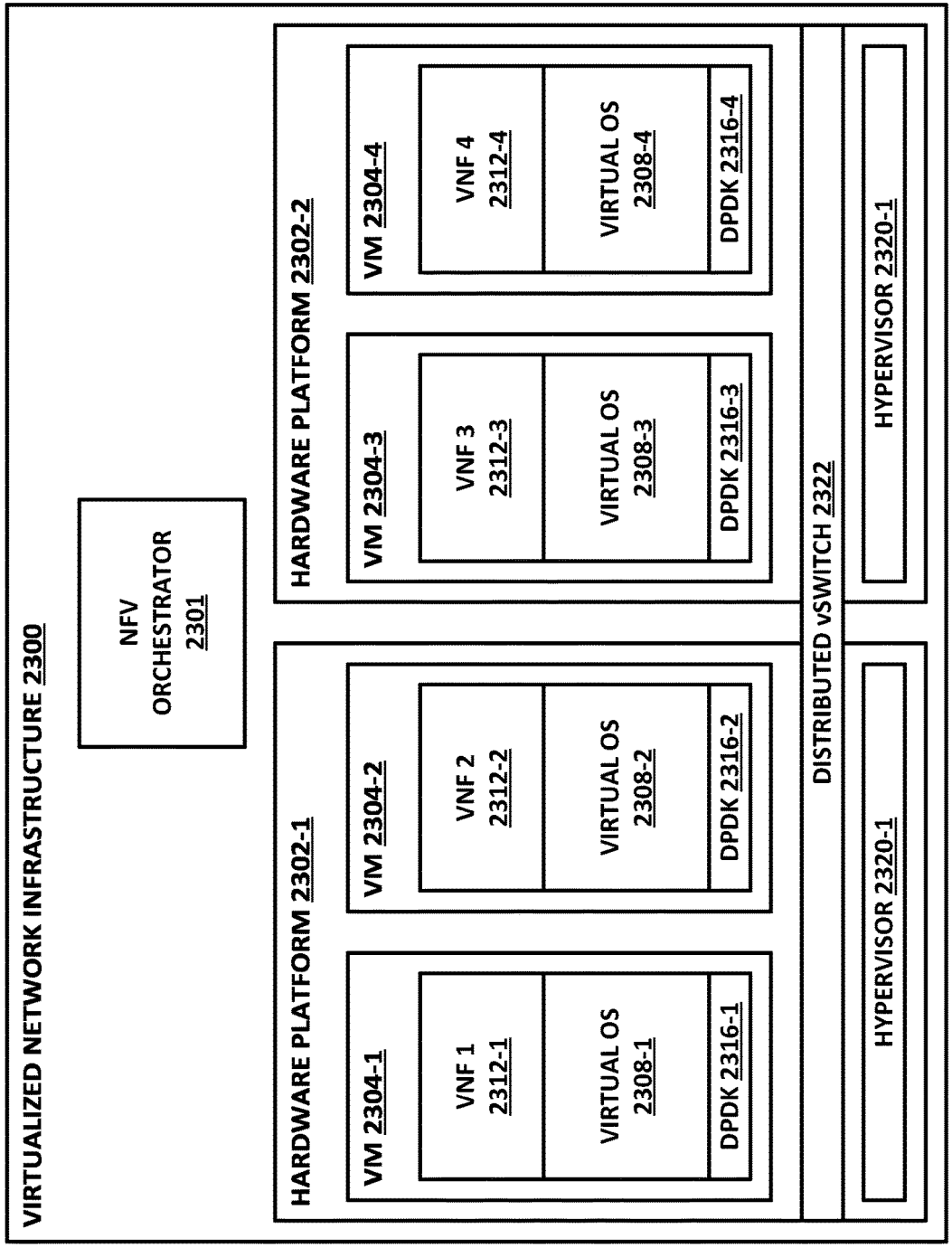
FIG. 23 is a block diagram of selected elements of a network function virtualization (NFV) infrastructure.

FIG. 23 is a block diagram of a network function virtualization (NFV) infrastructure 2300. NFV is an aspect of network virtualization that is generally considered distinct from, but that can still interoperate with, software defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 2300. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 23, an NFV orchestrator 2301 manages a number of the VNFs 2312 running on an NFVI 2300. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 2301 a valuable system resource. Note that NFV orchestrator 2301 may provide a browser-based or graphical configuration interface, and in some embodiments may be integrated with SDN orchestration functions.

Note that NFV orchestrator 2301 itself may be virtualized (rather than a special-purpose hardware appliance). NFV orchestrator 2301 may be integrated within an existing SDN system, wherein an operations support system (OSS) manages the SDN. This may interact with cloud resource management systems (e.g., OpenStack) to provide NFV orchestration. An NFVI 2300 may include the hardware, software, and other infrastructure to enable VNFs to run. This may include a hardware platform 2302 on which one or more VMs 2304 may run. For example, hardware platform 2302-1 in this example runs VMs 2304-1 and 2304-2. Hardware platform 2302-2 runs VMs 2304-3 and 2304-4. Each hardware platform may include a hypervisor 2320, virtual machine manager (VMM), or similar function, which may include and run on a native (bare metal) operating system, which may be minimal so as to consume very few resources.

Hardware platforms 2302 may be or comprise a rack or several racks of blade or slot servers (including, e.g., processors, memory, and storage), one or more data centers, other hardware resources distributed across one or more geographic locations, hardware switches, or network interfaces. An NFVI 2300 may also include the software architecture that enables hypervisors to run and be managed by NFV orchestrator 2301.

Running on NFVI 2300 are a number of VMs 2304, each of which in this example is a VNF providing a virtual service appliance. Each VM 2304 in this example includes an instance of the Data Plane Development Kit (DPDK), a virtual operating system 2308, and an application providing the VNF 2312.

Virtualized network functions could include, as nonlimiting and illustrative examples, firewalls, intrusion detection systems, load balancers, routers, session border controllers, DPI services, NAT modules, or call security association.

The illustration of FIG. 23 shows that a number of VNFs 2304 have been provisioned and exist within NFVI 2300. This FIGURE does not necessarily illustrate any relationship between the VNFs and the larger network, or the packet flows that NFVI 2300 may employ.

The illustrated DPDK instances 2316 provide a set of highly-optimized libraries for communicating across a virtual switch (vSwitch) 2322. Like VMs 2304, vSwitch 2322 is provisioned and allocated by a hypervisor 2320. The hypervisor uses a network interface to connect the hardware platform to the data center fabric (e.g., an HFI). This HFI may be shared by all VMs 2304 running on a hardware platform 2302. Thus, a vSwitch may be allocated to switch traffic between VMs 2304. The vSwitch may be a pure software vSwitch (e.g., a shared memory vSwitch), which may be optimized so that data are not moved between memory locations, but rather, the data may stay in one place, and pointers may be passed between VMs 2304 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 2322 is illustrated, wherein vSwitch 2322 is shared between two or more physical hardware platforms 2302.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile random access memory (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor, a memory, and a network interface; and instructions encoded within the memory to instruct the processor to: receive an incoming packet via the network interface; extract from the incoming packet a source port and a source internet protocol (IP) address; correlate the source port and source IP to a device identifier (ID); receive a network policy for the device ID; and apply the network policy to the incoming packet.

There is further disclosed an example computing apparatus, wherein the instructions are further to: receive an enumeration of a plurality of devices connected to a local network; assign device identifiers to the plurality of devices; and assign mutually-exclusive source port ranges to the plurality of devices.

There is further disclosed an example computing apparatus, wherein the device identifiers include media access control (MAC) addresses of the plurality of devices.

There is further disclosed an example computing apparatus, wherein the device identifiers include hashes of media access control (MAC) addresses of the plurality of devices.

There is further disclosed an example computing apparatus, wherein the instructions are further to: inspect a destination port of the incoming packet; correlate the destination port to a non-standard domain name system (DNS) query port; and apply a device policy to the incoming packet according to the non-standard DNS query port.

There is further disclosed an example computing apparatus, wherein the instructions are further to push translation instructions to a home gateway with instructions to map a plurality of devices to a plurality of mutually-exclusive source ports.

There is further disclosed an example computing apparatus, wherein the instructions are further to push translation instructions to a home gateway with instructions to map DNS queries to a non-standard destination port.

There is further disclosed an example computing apparatus, wherein the instructions are further to push translation instructions to a home gateway with instructions to map DNS queries to device-specific non-standard destination ports for a plurality of LAN-connected devices.

There is further disclosed an example computing apparatus, wherein pushing translation instructions comprises operating a TR69 interface.

There is further disclosed an example computing apparatus, wherein pushing translation instructions comprises pushing out text configuration instructions for a network address translation (NAT) engine.

There is also disclosed an example of one or more tangible, non-transitory computer-readable storage media having stored thereon executable instructions to: receive an incoming network packet; inspect the incoming network packet to determine a source or destination port; correlate the source or destination port to a subscriber identification (ID); receive a policy according to the subscriber ID; and apply the policy to the incoming network packet.

There is further disclosed an example of one or more tangible, non-transitory computer-readable media, wherein the instructions are further to correlate the source or destination port to a particular device or class of devices enumerated on a network of the subscriber ID.

There is further disclosed an example of one or more tangible, non-transitory computer-readable media, wherein the packet comprises a domain name system (DNS) query, and wherein the source or destination port is a destination port other than 53.

There is further disclosed an example of one or more tangible, non-transitory computer-readable media, wherein the source or destination port is a source port, and wherein the instructions are further to correlate the source port to a source port range assigned to a device enumerated on a network of the subscriber ID.

There is further disclosed an example of one or more tangible, non-transitory computer-readable media, wherein the instructions are further to: receive an enumeration of a plurality of devices connected to a local network; assign device identifiers to the plurality of devices; and assign mutually-exclusive source port ranges to the plurality of devices.

There is further disclosed an example of one or more tangible, non-transitory computer-readable media, wherein the device identifiers include media access control (MAC) addresses of the plurality of devices.

There is further disclosed an example of one or more tangible, non-transitory computer-readable media, wherein the device identifiers include hashes of media access control (MAC) addresses of the plurality of devices.

There is further disclosed an example of one or more tangible, non-transitory computer-readable media, wherein the instructions are further to: inspect a destination port of the incoming network packet; correlate the destination port to a non-standard domain name system (DNS) query port; and apply a device policy to the incoming network packet according to the non-standard DNS query port.

There is further disclosed an example of one or more tangible, non-transitory computer-readable media, wherein the instructions are further to push translation instructions to a home gateway with instructions to map a plurality of devices to a plurality of mutually-exclusive source ports.

There is further disclosed an example of one or more tangible, non-transitory computer-readable media, wherein the instructions are further to push translation instructions to a home gateway with instructions to map DNS queries to a non-standard destination port.

There is further disclosed an example of one or more tangible, non-transitory computer-readable media, wherein the instructions are further to push translation instructions to a home gateway with instructions to map DNS queries to device-specific non-standard destination ports for a plurality of LAN-connected devices.

There is further disclosed an example of one or more tangible, non-transitory computer-readable media, wherein pushing translation instructions comprises operating a TR69 interface.

There is further disclosed an example of one or more tangible, non-transitory computer-readable media, wherein pushing translation instructions comprises pushing out text configuration instructions for a network address translation (NAT) engine.

There is also disclosed an example computer-implemented method, comprising: extracting from a network packet a source internet protocol (IP) address and a port number; correlating the source IP address to a subscriber identification (ID) for a subscriber to a cloud-based security service; correlating the port number to a device or group of devices enumerated on a home network of the subscriber; receiving a network security policy according to the device or group of devices; and applying the network security policy to the network packet.

There is further disclosed an example method, further comprising: receiving an enumeration of a plurality of devices connected to a local network; assigning device identifiers to the plurality of devices; and assigning mutually-exclusive source port ranges to the plurality of devices.

There is further disclosed an example method, wherein the device identifiers include media access control (MAC) addresses of the plurality of devices.

There is further disclosed an example method, wherein the device identifiers include hashes of media access control (MAC) addresses of the plurality of devices.

There is further disclosed an example method, further comprising: inspecting a destination port of the network packet; correlating the destination port to a non-standard domain name system (DNS) query port; and applying a device policy to the network packet according to the non-standard DNS query port.

There is further disclosed an example method, further comprising pushing translation instructions to a home gateway with instructions to map a plurality of devices to a plurality of mutually-exclusive source ports.

There is further disclosed an example method, further comprising pushing translation instructions to a home gateway with instructions to map DNS queries to a non-standard destination port.

There is further disclosed an example method, further comprising pushing translation instructions to a home gateway with instructions to map DNS queries to device-specific non-standard destination ports for a plurality of LAN-connected devices.

There is further disclosed an example method, wherein pushing translation instructions comprises operating a TR69 interface.

There is further disclosed an example method, wherein pushing translation instructions comprises pushing out text configuration instructions for a network address translation (NAT) engine.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
a hardware platform comprising a processor, a memory, and a network interface; and
instructions encoded within the memory to instruct the processor to:
push instructions to a home gateway to map a plurality of endpoint devices to a plurality of mutually-exclusive source ports;
receive an incoming packet via the network interface;
extract from the incoming packet a source port and a source internet protocol (IP) address;
correlate the source port and source IP to a device identifier (ID) based on one of the mutually-exclusive source ports;
receive from a cloud service a network policy for the device ID based on one of the mutually-exclusive source ports; and
apply the network policy to the incoming packet.

2. The computing apparatus of claim 1, wherein the instructions are further to:
receive an enumeration of a plurality of devices connected to a local network;
assign device identifiers to the plurality of devices; and
assign mutually-exclusive source port ranges to the plurality of devices.

3. The computing apparatus of claim 2, wherein the device identifiers include media access control (MAC) addresses of the plurality of devices.

4. The computing apparatus of claim 2, wherein the device identifiers include hashes of media access control (MAC) addresses of the plurality of devices.

5. The computing apparatus of claim 1, wherein the instructions are further to:
inspect a destination port of the incoming packet;
correlate the destination port to a non-standard domain name system (DNS) query port; and
apply a device policy to the incoming packet according to the non-standard DNS query port.

6. The computing apparatus of claim 1, wherein pushing translation instructions comprises operating a TR69 interface.

7. The computing apparatus of claim 1, wherein pushing translation instructions comprises pushing out text configuration instructions for a network address translation (NAT) engine.

8. The computing apparatus of claim 1, wherein the instructions are further to push translation instructions to a home gateway with instructions to map DNS queries to a non-standard destination port.

9. The computing apparatus of claim 1, wherein the instructions are further to push translation instructions to a home gateway with instructions to map DNS queries to device-specific non-standard destination ports for a plurality of LAN-connected devices.

10. One or more tangible, non-transitory computer-readable storage media having stored thereon executable instructions to:
receive an incoming network packet;
inspect the incoming network packet to determine a source or destination port;
correlate the source or destination port to a subscriber identification (ID), comprising querying a list of mutually-exclusive port assignments, wherein the mutually-exclusive port assignments correlate to the subscriber ID;
receive from a cloud service a policy according to the subscriber ID; and
apply the policy to the incoming network packet.

11. The one or more tangible, non-transitory computer-readable media of claim 10, wherein the instructions are further to correlate the source or destination port to a particular device or class of devices enumerated on a network of the subscriber ID.

12. The one or more tangible, non-transitory computer-readable media of claim 10, wherein the incoming network packet comprises a domain name system (DNS) query, and wherein the source or destination port is a destination port other than 53.

13. The one or more tangible, non-transitory computer-readable media of claim 10, wherein the source or destination port is a source port, and wherein the instructions are further to correlate the source port to a source port range assigned to a device enumerated on a network of the subscriber ID.

14. The one or more tangible, non-transitory computer-readable media of claim 10, wherein the instructions are further to:
receive an enumeration of a plurality of devices connected to a local network;
assign device identifiers to the plurality of devices; and
assign mutually-exclusive source port ranges to the plurality of devices.

15. A computer-implemented method, comprising:
extracting from a network packet a source internet protocol (IP) address and a port number;
correlating the source IP address to a subscriber identification (ID) for a subscriber to a cloud-based security service;
correlating the port number to a device or group of devices enumerated on a home network of the subscriber, wherein a plurality of devices or groups of devices are assigned mutually-exclusive source port ranges;
receiving a network security policy according to the device or group of devices; and
applying the network security policy to the network packet.

16. The computer-implemented method of claim 15, further comprising correlating a source or destination port to a particular device or class of devices enumerated on a network of the subscriber ID.

17. The computer-implemented method of claim 16, wherein the network packet comprises a domain name system (DNS) query, and wherein the source or destination port is a destination port other than 53.

18. The computer-implemented method of claim 16, wherein the source or destination port is a source port, further comprising correlating the source port to a source port range assigned to a device enumerated on a network of the subscriber ID.

19. The method of claim 15, further comprising:
receiving an enumeration of a plurality of devices connected to a local network;
assigning device identifiers to the plurality of devices; and
assigning mutually-exclusive source port ranges to the plurality of devices.

* * * * *

UNITED STATES PATENT AND TRADEMARK OFFICE
CERTIFICATE OF CORRECTION

| | |
|---|---|
| PATENT NO. | : 11,824,645 B2 |
| APPLICATION NO. | : 16/933289 |
| DATED | : November 21, 2023 |
| INVENTOR(S) | : Joshi et al. |

It is certified that error appears in the above-identified patent and that said Letters Patent is hereby corrected as shown below:

In the Claims

In Column 40, Claim 19, Line 30, delete "method" and insert -- computer-implemented method --, therefor.

Signed and Sealed this
Twenty-seventh Day of February, 2024

*Katherine Kelly Vidal*

Katherine Kelly Vidal
*Director of the United States Patent and Trademark Office*